(12) United States Patent
Sawyer et al.

(10) Patent No.: US 10,723,842 B2
(45) Date of Patent: Jul. 28, 2020

(54) MESH SIZE CONTROL OF LUBRICATION IN GEMINI HYDROGELS

(71) Applicant: University of Florida Research Foundation, Inc., Gainesville, FL (US)

(72) Inventors: Wallace G. Sawyer, Gainesville, FL (US); Angela A. Pitenis, Gainesville, FL (US); Juan Manuel Uruena, Gainesville, FL (US); Ryan M. Nixon, Gainesville, FL (US); Kyle D. Schulze, Gainesville, FL (US); Thomas E. Angelini, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 15/551,055

(22) PCT Filed: Mar. 10, 2016

(86) PCT No.: PCT/US2016/021787
§ 371 (c)(1),
(2) Date: Aug. 15, 2017

(87) PCT Pub. No.: WO2016/145204
PCT Pub. Date: Sep. 15, 2016

(65) Prior Publication Data
US 2018/0030209 A1 Feb. 1, 2018

Related U.S. Application Data

(60) Provisional application No. 62/131,493, filed on Mar. 11, 2015.

(51) Int. Cl.
*G02B 1/04* (2006.01)
*C08G 77/20* (2006.01)
(Continued)

(52) U.S. Cl.
CPC ........ *C08G 77/20* (2013.01); *B29D 11/00048* (2013.01); *B29D 11/00125* (2013.01);
(Continued)

(58) Field of Classification Search
CPC ............. C08G 77/20; B29D 11/00048; B29D 11/00125; B29D 11/11865;
(Continued)

(56) References Cited

U.S. PATENT DOCUMENTS

| 3,408,429 A | 10/1968 | Wichterle |
| 4,136,250 A | 1/1979 | Mueller et al. |

(Continued)

FOREIGN PATENT DOCUMENTS

| CN | 101555306 | 10/2009 |
| EP | 0632329 | 1/1995 |

(Continued)

OTHER PUBLICATIONS

Kotsmar et al. Mesh Size of Soft-Contact-Lens Hydrogels, Invest. Ophthalmol. Vis. Sci. 2011;52(14) (Year: 2011).*

(Continued)

*Primary Examiner* — Travis S Fissel
(74) *Attorney, Agent, or Firm* — Thomas|Horstemeyer, LLP

(57) ABSTRACT

A device comprises a surface that is a hydrogel having a targeted mesh size that permits a low-speed friction coefficient near or lower that that typically reported for cartilage of 0.01 to 0.02, a transition. The device can be a contact lens to sit on the cornea where, during a blink, eyelid slides past the eye surface at about 100 mm s$^{-1}$. The hydrodynamic lubrication of the hydrogel of the device separates the contact lens surface from the surfaces of the tarsal conjunctiva and marginal conjunctiva of the eyelid. Other devices (Continued)

that can comprise the hydrogel of a targeted mesh size are those that can contact cartilage of articulating joints.

16 Claims, 8 Drawing Sheets

(51) Int. Cl.
| | | |
|---|---|---|
| *C08L 83/06* | (2006.01) | |
| *B29D 11/00* | (2006.01) | |
| *B29K 77/00* | (2006.01) | |
| *B29K 105/00* | (2006.01) | |

(52) U.S. Cl.
CPC ........ *B29D 11/00865* (2013.01); *C08L 83/06* (2013.01); *G02B 1/043* (2013.01); *B29D 11/00038* (2013.01); *B29K 2077/00* (2013.01); *B29K 2105/0061* (2013.01)

(58) Field of Classification Search
CPC .......... B29D 11/00038; B29K 2077/00; B29K 2105/0061
USPC ............ 351/159.33, 159.02, 159.57, 159.73, 351/159.74, 178
See application file for complete search history.

(56) References Cited

U.S. PATENT DOCUMENTS

| | | |
|---|---|---|
| 4,143,949 A | 3/1979 | Chen |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,276,402 A | 6/1981 | Chromecek et al. |
| 4,312,575 A | 1/1982 | Peyman et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |
| 5,346,946 A | 9/1994 | Yokoyama et al. |
| 5,352,714 A | 10/1994 | Lai et al. |
| 5,358,995 A | 10/1994 | Lai et al. |
| 5,387,632 A | 2/1995 | Lai et al. |
| 5,416,132 A | 5/1995 | Yokoyama et al. |
| 5,451,617 A | 9/1995 | Lai et al. |
| 5,458,579 A | 10/1995 | Chodorow et al. |
| 5,464,667 A | 11/1995 | Köhler et al. |
| 5,508,317 A | 4/1996 | Müller |
| 5,583,163 A | 10/1996 | Müller |
| 5,583,463 A | 12/1996 | Merritt |
| 5,599,576 A | 2/1997 | Opolski |
| 5,665,840 A | 9/1997 | Pöhlmann et al. |
| 5,712,356 A | 1/1998 | Bothe et al. |
| 5,760,100 A | 6/1998 | Nicolson et al. |
| 5,766,158 A | 6/1998 | Opolski |
| 5,789,464 A | 8/1998 | Müller |
| 5,843,346 A | 12/1998 | Morrill |
| 5,849,810 A | 12/1998 | Müller |
| 5,849,841 A | 12/1998 | Mühlebach et al. |
| 5,894,002 A | 4/1999 | Boneberger et al. |
| 5,962,548 A | 10/1999 | Vanderlaan et al. |
| 5,981,675 A | 11/1999 | Valint, Jr. et al. |
| 6,039,913 A | 3/2000 | Hirt et al. |
| 6,087,415 A | 7/2000 | Vanderlaan et al. |
| 6,096,726 A | 8/2000 | Opolski |
| 6,099,122 A | 8/2000 | Chabrecek et al. |
| 6,165,408 A | 12/2000 | Steinmann |
| 6,221,303 B1 | 4/2001 | Steinmann |
| 6,303,687 B1 | 10/2001 | Müller |
| 6,340,465 B1 | 1/2002 | Hsu et al. |
| 6,367,929 B1 | 4/2002 | Maiden et al. |
| 6,436,481 B1 | 8/2002 | Chabrecek et al. |
| 6,440,571 B1 | 8/2002 | Valint, Jr. et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,500,481 B1 | 12/2002 | Vanderlaan et al. |
| 6,521,352 B1 | 2/2003 | Chabrecek et al. |
| 6,534,559 B1 | 3/2003 | Vanderlaan et al. |
| 6,586,038 B1 | 7/2003 | Chabrecek et al. |
| 6,623,747 B1 | 9/2003 | Chatelier et al. |
| 6,683,062 B2 | 1/2004 | Opolski |
| 6,719,929 B2 | 4/2004 | Winterton et al. |
| 6,730,366 B2 | 5/2004 | Lohmann et al. |
| 6,734,321 B2 | 5/2004 | Chabrecek et al. |
| 6,762,264 B2 | 7/2004 | Künzler et al. |
| 6,793,973 B2 | 9/2004 | Winterton et al. |
| 6,800,225 B1 | 10/2004 | Hagmann et al. |
| 6,811,805 B2 | 11/2004 | Gilliard et al. |
| 6,835,410 B2 | 12/2004 | Chabrecek et al. |
| 6,838,491 B1 | 1/2005 | Vanderlaan et al. |
| 6,866,936 B2 | 3/2005 | Opolski |
| 6,867,245 B2 | 3/2005 | Iwata et al. |
| 6,878,399 B2 | 4/2005 | Chabrecek et al. |
| 6,881,269 B2 | 4/2005 | Matsuzawa et al. |
| 6,896,926 B2 | 5/2005 | Qiu et al. |
| 6,923,978 B2 | 8/2005 | Chatelier et al. |
| 6,940,580 B2 | 9/2005 | Winterton et al. |
| 6,995,192 B2 | 2/2006 | Phelan et al. |
| 7,078,074 B2 | 7/2006 | Matsuzawa et al. |
| 7,268,198 B2 | 9/2007 | Kunzler et al. |
| 7,384,590 B2 | 6/2008 | Kelly et al. |
| 7,387,759 B2 | 6/2008 | Kelly et al. |
| 7,540,609 B2 | 6/2009 | Chen et al. |
| 7,572,841 B2 | 8/2009 | Chen et al. |
| 7,977,430 B2 | 7/2011 | Devlin et al. |
| 8,044,112 B2 | 10/2011 | Matsuzawa |
| 8,048,968 B2 | 11/2011 | Phelan et al. |
| 8,129,442 B2 | 3/2012 | Ueyama et al. |
| 8,147,897 B2 | 4/2012 | Ferreiro et al. |
| 8,158,192 B2 | 4/2012 | Bothe et al. |
| 8,404,759 B2 | 3/2013 | Phelan |
| 8,480,227 B2 | 7/2013 | Qiu et al. |
| 8,524,850 B2 | 9/2013 | Ueyama et al. |
| 8,529,057 B2 | 9/2013 | Qiu et al. |
| 8,703,891 B2 | 4/2014 | Broad |
| 8,820,925 B2 | 9/2014 | Liu |
| 8,835,525 B2 | 9/2014 | Kuyu et al. |
| 8,865,789 B2 | 10/2014 | Yao et al. |
| 8,937,110 B2 | 1/2015 | Alli et al. |
| 8,937,111 B2 | 1/2015 | Alli et al. |
| 9,156,213 B2 | 10/2015 | Qiu et al. |
| 2003/0175325 A1* | 9/2003 | Chatelier ................ A61L 27/34 424/429 |
| 2006/0072069 A1* | 4/2006 | Laredo .................... A61L 27/52 351/159.33 |
| 2007/0122540 A1 | 5/2007 | Salamone et al. |
| 2008/0142038 A1 | 6/2008 | Kunzler et al. |
| 2008/0275156 A1 | 11/2008 | Laredo et al. |
| 2009/0059165 A1* | 3/2009 | Pruitt ..................... G02B 1/043 351/159.33 |
| 2009/0145086 A1 | 6/2009 | Reynolds et al. |

(56) References Cited

U.S. PATENT DOCUMENTS

| | | | |
|---|---|---|---|
| 2009/0145091 A1 | 6/2009 | Connolly et al. | |
| 2011/0134387 A1 | 6/2011 | Samuel et al. | |
| 2012/0026457 A1 | 2/2012 | Qiu et al. | |
| 2012/0026458 A1* | 2/2012 | Qiu .................. | G02B 1/043 351/159.33 |
| 2012/0088844 A1 | 4/2012 | Kuyu et al. | |
| 2012/0088861 A1 | 4/2012 | Huang et al. | |
| 2012/0314185 A1 | 12/2012 | Bauman et al. | |
| 2013/0195952 A1 | 8/2013 | Byrne et al. | |
| 2013/0274371 A1 | 10/2013 | Higgs et al. | |
| 2013/0337160 A1 | 12/2013 | Holland et al. | |
| 2014/0171543 A1* | 6/2014 | Chang .................. | C08G 18/10 523/107 |

FOREIGN PATENT DOCUMENTS

| | | |
|---|---|---|
| JP | 2001075060 | 3/2001 |
| JP | 2013533517 A | 8/2013 |

OTHER PUBLICATIONS

Polymer Fluctuation Lubrication in Hydrogel Gemini Interfaces; Soft Matter, Pitenis et al. (Year: 2014).*

Maddox, D.M., "The Application of Plasmas to Thin Film Deposition Processes," *Plasma-Surface Interactions and Processing of Materials*, 1990, pp. 377-399, vol. 176.

Pitenis, A.A. et al., "Polymer fluctuation lubrication in hydrogel gemini interfaces," *Soft Matter*, 2014, pp. 8955-8962, vol. 10.

Kern J. et al., "Assessment of the relationship between contact lens coefficient of friction and subject lens comfort," *Invest Ophthalmol Vis Sci*, Jun. 2013, vol. 54, ARVO E-Abstract 494, [online, webpage, retrieved Nov. 03, 2017] from: http://iovs.arvojournals.org/article.aspx?articleid=2149853, pp. 1-2.

Caligaris, M, et al., "Effects of sustained interstitial fluid pressurization under migrating contact area, and boundary lubrication by synovial fluid, on cartilage friction," *Osteoarthritis and Cartilage*, Oct. 2008, pp. 1220-1227, vol. 16, No. 10.

Kim S.H. et al., "AFM and SFG studies of pHEMA-based hydrogel contact lens surfaces in saline solution: adhesion, friction, and the presence of non-crosslinked polymer chains at the surface," *Biomaterials*, 2002, pp. 1657-1666, vol. 23, No. 7.

Jones, L. et al., "The TFOS International Workshop on Contact Lens Discomfort: Report of the Contact Lens Materials, Design, and Care Subcommittee," *Invest Ophthalmol Vis Sci*, Oct. 2013, pp. TFOS37-70, vol. 54, No. 11.

Brennan, N. A., *Optom Vis Sci*, 2009;86:e-abstract 90957.

Coles, C. et al., *Optom Vis Sci*, 2012;88:e-abstract 125603.

Dilsiz, N. et al., "Plasma polymerization of selected organic compounds", *Polymer*, 1996, pp. 333-341, vol. 37.

Dunn, A.C. et al., "Gemini Interfaces in Aqueous Lubrication with Hydrogels," *Tribology Letters*, Apr. 2014, pp. 59-66, vol. 54, No. 1.

Fonn, D., "The Clinical Relevance of Contact Lens Lubricity, Using science to provide better comfort for contact lens wearers," *Contact Lens Spectrum*, 2013, pp. 28-33, vol. 28.

Gong, J.P., "Friction and lubication of hydrogels—its richness and complexity," *Soft Matter*, 2006, pp. 544-552, vol. 2.

Hartmann, R. Plasma polymerisation: Grundlagen, Technik und Anwendung, Jahrb. Oberflächentechnik, *Battelle-Inst. E.V. Frankfurt/Main Germany*, 1993, pp. 283-296, No. 49.

Ho, C-H. et al., Ultrathin coating of plasma polymer of methane applied on the surface of silicone contact lenses, *Journal of Biomedical Materials Research*, 1988, pp. 919-937, vol. 22.

Hume, S.L. et al., "Surface chemistry and size influence the release of model therapeutic nanoparticles from poly(ethylene glycol) hydrogels," *J Nanopart Res*, Apr. 2013, pp. 1635-1650, vol. 15.

Kim, S.H. et al., "Friction studies of hydrogel contact lenses using AFM: non-crosslinked polymers of low friction at the surface," *Biomaterials*, 2001, pp. 3285-3294, vol. 22.

Krick, B.A. et al., "A Little Analysis of Errors in Friction for Small Wear Tracks," *Tribol Lett*, 2010, pp. 221-222, vol. 39.

Lai, Y-C. et al., "Surface wettability enhancement of silicone hydrogel lenses by processing with polar plastic molds," *J. Biomed. Mat. Res.*, 1997, pp. 349-356, vol. 35, No. 3.

Rennie, A.C. et al., "Friction coeffecient of soft contact lenses: measurements and modeling," *Tribology Letters*, Apr. 2005, pp. 499-504, vol. 18, No. 4.

Roba, M. et al., "Friction Measurements on Contact Lenses in Their Operatiing Environment," *Tribol Lett*, 2011, pp. 387-397, vol. 44.

Subbaraman, L. N. et al., "Measuring Friction and Lubricity of Soft Contact Lenses: A Review Comfort may be tied to friction and lubicity," *Contact Lens Spectrum*, 2013, pp. 28-33, vol. 28.

Yasuda, H., Glow Discharge Polymerization, *Journal of Polymer Science: Macromolecular Reviews*, 1981, pp. 199-293, vol. 16.

Uruena et al., Mesh Size Control of Polymer Fluctuation Lubrication in Gemini Hydrogels, Biotribology 1-2, 24-29, 2015.

Office Action issued by the Japanese Patent Office for Application 2017-547520, dated Dec. 3, 2019.

* cited by examiner

MESH SIZE CONTROL OF LUBRICATION IN GEMINI HYDROGELS

CROSS-REFERENCE TO RELATED APPLICATIONS

This application is the U.S. national stage application of International patent application no. PCT/US2016/021787, filed Mar. 10, 2016, which claims the benefit of U.S. Provisional Application Ser. No. 62/131,493, filed Mar. 11, 2015, the disclosures of which are hereby incorporated by reference in their entireties, including all figures, tables and drawings.

FIELD OF INVENTION

The present invention generally relates to a biomedical device (preferably a lubricious contact lens) having, thereon, a surface layer of a hydrogel, the mesh size of which is controlled to give the biomedical device a lubricity equal or superior to the lubricity reported for cartilage, and to a method for producing such a biomedical device.

BACKGROUND OF INVENTION

Hydrogels are biocompatible polymers with highly tunable mechanical properties. Synthetic hydrogels are tissue-like in several ways, e.g., being soft, wet, and water-permeable, making them popular biomaterials in tissue engineering applications and biomedical devices. However, bio-tissues generally have a low friction (or high lubricity). For example, it is reported that the coefficient of friction of a bio-tissue, cartilage, is between 0.01 and 0.02 (Caligaris M, Ateshian G. A., Osteoarthritis Cartilage. 2008 October; 16(10):1220-7). In contrast, hydrogels may have relatively high friction (or low lubricity). Such an inadequate lubricity may hinder their wide applications as bio-tissue substitutes. It would be desirable for a hydrogel to have a lubricity that would be equal or superior to the lubricity reported for cartilage.

Lubricity describes the slipperiness of a surface, and generally can be characterized by its friction coefficient or coefficient of friction (CoF) which is measured in vitro as the ratio of the horizontal friction force between two bodies and the force pressing them together (or normal force). The lower the CoF is, the more lubricious the surface. Recent studies indicate a correlation between the in vitro measurements of coefficient of friction (CoF) of hydrogel contact lenses and subjective comfort (Brennan N A., Optom Vis Sci 2009; 86:e-abstract 90957; Coles C M L, Brennan N A., Optom Vis Sci 2012; 88:e-abstract 125603; Kern J, Rappon J, Bauman E, Vaughn B., Invest Ophthalmol Vis Sci 2013; ARVO E-Abstract 494; Jones L, Brennan N A, Gonzalez-Meijome J, Lally J, Maldonado-Codina C, Schmidt T A, Subbaraman L, Young G, Nichols J J, members of the TIWoCLD, Invest Ophthalmol Vis Sci 2013; 54:TFOS37-70; Subbaraman L. N. and Jones L. W., Contact Lens Spectrum 28:28-33 (2013); Fonn D., Contact Lens Spectrum 28:28-33 (2013)).

Unlike most physical properties of a material, CoF is not an intrinsic material property, but instead should be considered more correctly as a system property, because it depends upon many variables of a biomedical device (e.g., a contact lens) under testing and of a testing system, including materials used, a probing substrate against which a contact lens under test is moved, contact mode (e.g., a constant point of contact, a moving point of contact), normal force pressure, moving speed relative to each other, and lubricating fluid between the probing substrate and the testing lens, etc. Different methods has been developed/used in measuring in vitro the lubricity of contact lenses, such as, a tribometer (Rennie A. C., Dickrell P. L., Sawyer W. G., Tribology Letters 2005, 18:499-504; Roba M., Duncan E. G., Hill G. A., Spencer N. D., Tosatti S. G. P., Tribology Letters 2011, 44:387-97; U.S. Pat. No. 6,940,580), atomic force microscopy (Kim S. H., Marmo C., Somorjai G. A., Biomaterials 2001, 22:3285-94; Kim S. H., Opdahl A., Marmo C., Somorjai G. A., Biomaterials 2002, 23:1657-66), an inclined plane method (U.S. Pat. No. 8,480,227), lubricity ratings based on digital rubbing of lenses between the fingers (U.S. Pat. No. 8,480,227). However, results obtained by using those previously reported methods may not be compared to judge the true lubricity, because they all are system properties, depending upon the system used. In addition, they are not suitable for determining the in-vivo lubricity of a contact lens or a biomedical device, because a contact lens or biomedical device must interact with a soft-wet cornea or bio-tissue, not with a hard solid substrate.

Recently, Dunn, Sawyer and Angelini developed a method for determining friction coefficients (CoF) of hydrogel materials in a "Gemini" testing system (Dunn A. C., Sawyer W. G., Angelini T. E., Tribology Letters 54:59-66 (2014)). According to this method, CoF tests are carried out by moving a hydrogel sample against a hydrogel substrate, i.e., using "Gemini" soft wet hydrogel surfaces as interaction surfaces in the testing system. The Gemini testing system is similar to a biological system, e.g., the glycocalyx of the eyelid rubbing against the corneal glycocalyx in the eye. But, the CoF obtained by using this Gemini testing system is not an intrinsic material property, but instead is a system property. It would be desirable to use a non-system property to characterize (or measure) lubricity of a hydrogel.

Therefore, there is still a need for methods for determining and controlling the lubricity of a biomedical device made of a hydrogel and for developing and producing biomedical devices with a targeted lubricity. There is also need for a biomedical device with a target lubricity that is equal or superior to the lubricity reported for cartilage.

SUMMARY OF THE INVENTION

The invention, in one aspect, provides a biomedical device, which comprises a surface layer of a hydrogel having a targeted lubricity as measured by a targeted surface mesh size, wherein the targeted lubricity is equal or superior to the lubricity (CoF ~0.01) reported for cartilage.

The invention, in another aspect, provides a method for producing biomedical devices (preferably hydrogel contact lenses, more preferably silicone hydrogel contact lenses) according to procedure (I) or (II), wherein procedure (I) comprises the steps of: (a) obtaining preformed biomedical devices made of a first hydrogel; (b) selecting a surface treatment or a combination of two or more surface treatments, coating materials, and coating conditions under which the selected coating materials can be applied onto a preformed biomedical device according to the selected surface treatment or the selected combination the two or more surface treatments to obtain a coated biomedical device having a coating of a second hydrogel thereon, wherein the second hydrogel has a first targeted surface mesh size of at least 4.5 nm; and (c) applying the selected coating materials onto the preformed biomedical devices under the selected coating conditions to form the biomedical devices each having a coating of the second hydrogel having the first targeted surface mesh size, wherein procedure (II) comprises the steps of: (a) selecting a mold material for making molds; (b) selecting a polymerizable formulation and curing conditions under which the selected polymerizable composition can be cured in the selected mold under the selected curing conditions to form a biomedical device having a surface layer of a third hydrogel thereon, wherein the third hydrogel has a second targeted surface mesh size of at least 4.5 nm; and (c) introducing and curing the selected polymerizable formulation in the molds to form the biomedical devices each having the second targeted mesh size.

In a further aspect, the invention provides a method of manufacturing biomedical devices (preferably hydrogel contact lenses, more preferably silicone hydrogel contact lenses), comprising the step of: inspecting manufactured biomedical devices for having a targeted lubricity as measured by having a surface mesh size of at least 4.5 nm; and discarding those contact lenses which do not have the targeted lubricity.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

A "biomedical device" refers to a device having surfaces that contact tissue, blood, or other bodily fluids of patients in the course of their operation. Exemplary biomedical devices include: (1) extracorporeal devices for use in surgery such as blood oxygenators, blood pumps, blood sensors, tubing used to carry blood and the like which contact blood which is then returned to the patient; (2) prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; and (4) ophthalmic devices.

"An ophthalmic device", as used herein, refers to a contact lens, an intraocular lens, artificial cornea, a corneal onlay, and other ophthalmic devices (e.g., stents, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

Figure 1:
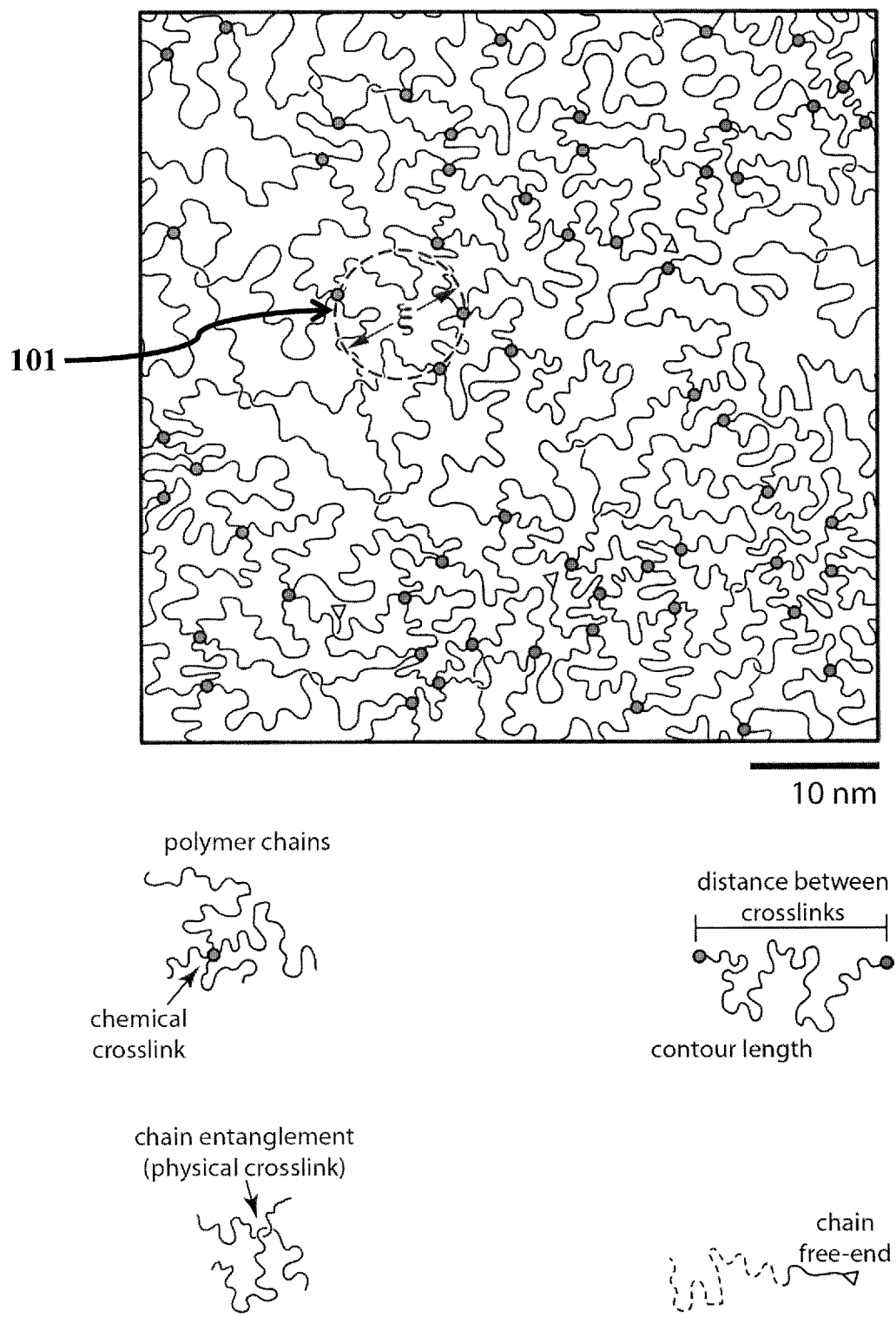
FIG. 1 schematically illustrates a semi-dilute flexible polymer network, with minimal coil overlap and a persistence length on the order of one nanometer (nm) where the average distance between crosslinks, or mesh size, $\xi$, is approximately 10 nm, where the network displays few physical chain entanglements and few chain free-ends.

A "hydrogel" refers to a crosslinked polymeric material which is not water-soluble and can contains at least 10% by weight of water within its polymer matrix (i.e., a crosslinked network of polymer chains) when fully hydrated. A representative flexible polymeric hydrogel network is illustrated in FIG. 1. A hydrogel Hydrogels are water-permeable materials, which can be easily created with varying mesh size, water content, permeability, and elastic properties. All mechanical and transport properties of hydrogels trace back to the mesh size $\xi$ (101), which is controlled during synthesis by carefully balancing the proportion of the repeating units and crosslinking units formed upon polymerization of a monomer mixture. The mesh size $\xi$ (101) is essentially the correlation length between all pairs of molecules comprising the hydrogel network, and in the case of semi-dilute hydrogels made from flexible polymers is of the same order of magnitude as the average spacing between the chemical crosslinks. Occasionally there are physical entanglements, and there may also be dangling chains each with one free loose end that remain after gelation; both are illustrated in FIG. 1 as indicated in the graphic legend therein. Dangling chains can be derived from a linear polymer having one sole terminal vinyl group, or formed from free radical polymerization initiation, chains transfer to monomer, and disproportion termination, during a vinyl addition polymerization. Chain entanglement can occur when vinylic monomers are polymerized in the presence of a preformed polymer chain which can be a polymer added in a polymerizable formulation for forming the hydrogel material or formed in-situ in an earlier fast phase of polymerization, to form a polymer chain (parts of interpenetrating or semi-penetrating networks). A hydrogel can also have microscopic pores which are filled with water and formed by removing unpolymerized materials (or so-called porogens) from resultant hydrogel material after polymerization.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "non-silicone hydrogel" refers to a hydrogel that is theoretically free of silicon.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.1% by weight at room temperature (i.e., a temperature of 20° C. to 28° C.).

The term "insoluble", in reference to a compound or material in a solvent, means that the compound or material can be dissolved in the solvent to give a solution with a concentration of less than 0.005% by weight at room temperature (as defined above). The term "ethylenically unsaturated group" is employed herein in a broad sense and is intended to encompass any groups containing at least one >C=C< group. Exemplary ethylenically unsaturated groups include without limitation (meth)acryloyl

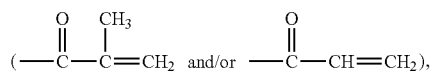

allyl, vinyl

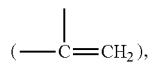

styrenyl, or other C=C containing groups.

The term "(meth)acrylamide" refers to methacrylamide and/or acrylamide.

The term "(meth)acrylate" refers to methacrylate and/or acrylate.

"Hydrophilic," as used herein, describes a material or portion thereof that will more readily associate with water than with lipids.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a compound or polymer that contains two or more ethylenically unsaturated groups and has an average molecular weight of greater than 700 Daltons.

As used in this application, the term "vinylic crosslinker" or "vinylic crosslinking agent" refers to a compound having at least two ethylenically unsaturated groups.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

A "polysiloxane" refers to a compound containing a polysiloxane segment of

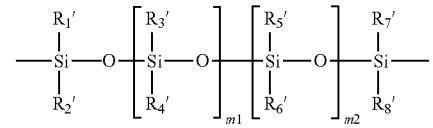

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, $C_5$-$C_{30}$ organic radical having one or more hydroxyl groups, -alk-$(OC_2H_4)_{m3}$—OR' (in which alk is $C_1$-$C_6$ alkyl diradical, R is H or $C_1$-$C_4$ alkyl and m3 is an integer from 1 to 10), or a linear hydrophilic polymer chain.

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application the term "azetidinium group" or "3-hydroxyazetidinium group" refers to a positively-charged, divalent radical (or group or moiety) of

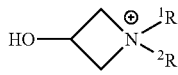

in which $^1R$ and $^2R$ are a hydrocarbon group.

The term "azlactone" refers to a mono-valent radical of formula

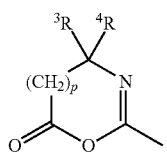

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

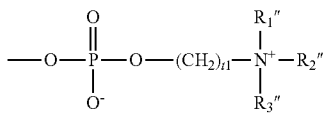

in which t1 is an integer of 1 to 5 and $R_1"$, $R_2"$ and $R_3"$ independently of one another are $C_1$-$C_8$ alkyl or $C_1$-$C_8$ hydroxyalkyl.

The term "reactive vinylic monomer" refers to a vinylic monomer having a reactive functional group selected from the group consisting of carboxyl groups (—COOH), azetidinium group, amino groups (i.e., primary and/or secondary amino groups), azlactone groups, isocyanate groups, epoxy groups, aziridine groups, or combinations thereof.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group. A non-reactive vinylic monomer can include a hydroxyl group or a tertiary or quaternium amino group.

In this application, an "oxazoline" refers to a compound of

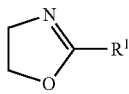

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); and m3 is an integer from 1 to 10 (preferably 1 to 5).

In this application, the term "polyoxazoline" refers to a linear polymer having a formula of

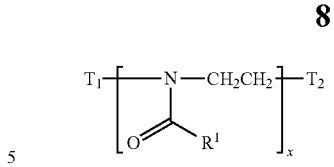

in which: T1 and T2 are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

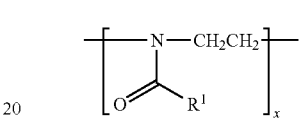

in which $R^1$ and x are as defined above.

In this application, the term "poly(2-oxazoline-co-ethyleneimine)" refers to a statistical copolymer having a formula of

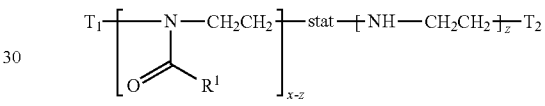

in which: T1 and T2 are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (?90%) of the secondary amine groups of the poly(2-oxazoline-co-ethyleneimine) into azetidinium groups. Examples of poly (2-oxazoline-co-ethyleneimine)-epichlorohydrin are disclosed in U.S. Pat. Pub. No. 2013/0337160 A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22°

C. to about 28° C., preferably from about 24° C. to about 26° C., in particular at about 25° C.) to an extend detectable for a period of about one hour.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

A "water contact angle" refers to an average water contact angle (i.e., contact angles measured by Sessile Drop method) at the room temperature, which is obtained by averaging measurements of contact angles with at least 3 individual contact lenses. Water contact angle (WCA) on a contact lens is a general measure of the surface wettability of a contact lens (or a material). In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

The surface hydrophilicity of a contact lens (or a biomedical device or a material) is assessed by determining water-break-up time (WBUT), i.e., the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT >10 seconds are considered to have a hydrophilic surface and are expected to exhibit adequate wettability (ability to support the tear film) on-eye.

An "organic-based solution" refers to a solution which is a homogeneous mixture consisting of an organic-based solvent and one or more solutes dissolved in the organic based solvent. An organic-based coating solution refers to an organic-based solution containing at least one polymeric coating material as a solute in the solution.

An "organic-based solvent" is intended to describe a solvent system which consists of one or more organic solvents and optionally about 40% or less, preferably about 30% or less, more preferably about 20% or less, even more preferably about 10% or less, in particular about 5% or less by weight of water relative to the weight of the solvent system.

In this application, the term "surface mesh size" in reference to a hydrogel biomedical device (or hydrogel contact lens or hydrogel) means that the mesh size of the hydrogel biomedical device (preferably hydrogel contact lens or hydrogel) is determined directly within the surface region from 0 to about 400 nm from the surface of the hydrogel biomedical device (or hydrogel contact lens or hydrogel) according to a quadrant micro-rheological technique described in Example 2. The quadrant micro-rheological technique allows simultaneously tracking of several nanoparticles located within a distance of about 400 nm or less from the surface of the hydrogel biomedical device using video microscopy, and is taught in detail in Example 2.

The term "surface layer" in reference to a biomedical device means a layer of a material which is the outmost layer on the biomedical device (or contact lens) and includes the surface of the biomedical device (or contact lens).

The invention is generally directed to a biomedical device (preferably a contact lens), which comprises a surface layer of a hydrogel having a targeted surface mesh size so as to achieve a lubricity equal to or superior to the reported lubricity of cartilage (CoF being 0.01) and to methods for producing such a lubricious biomedical device (preferably contact lens). The invention is partly based on the discoveries that the mesh size 4 in the polymer network of a hydrogel material is one parameter that not only can control the elasticity and permeability of hydrogels and the dynamics of the constituent polymer chains, but also can measure the lubricity of the hydrogel material.

Figure 2A:
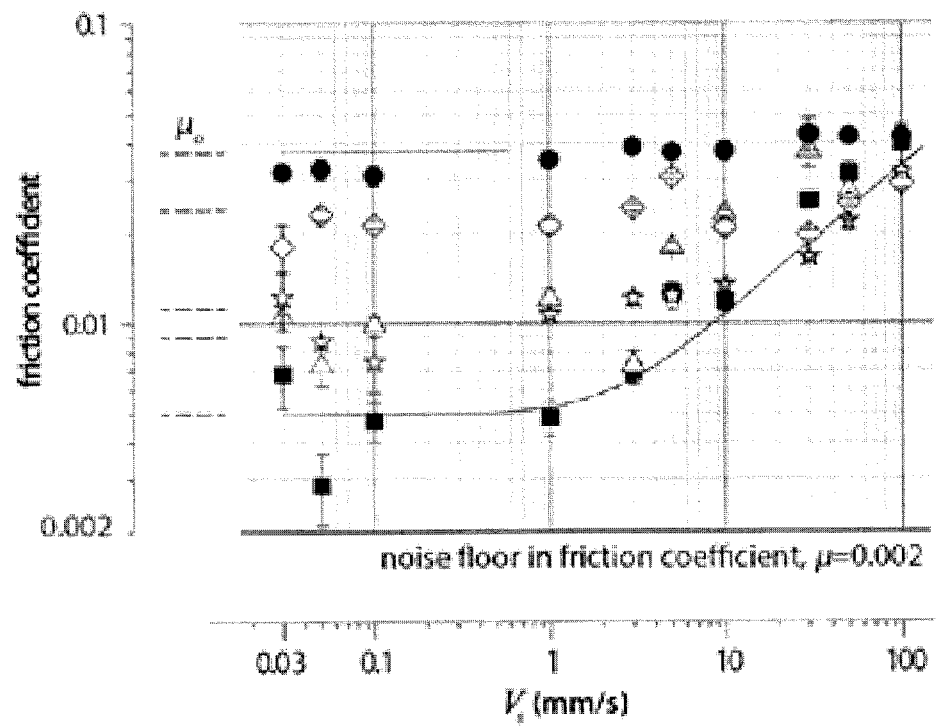
FIG. 2A shows plots of friction coefficients as a function of sliding speed for five different polymer hydrogel concentrations where the solid lines are guides that highlight the transition in friction behavior as the sliding speed increases and the dashed lines indicate the average friction coefficient in the speed independent regime, $\mu_o$, for each of the five samples.

FIG. 2A shows a logarithm plot of friction coefficient (μ) as function of the sliding speed ($V_s$) of a hydrogel (polyacrylamide) against another polyacrylamide hydrogel, as described in Example 1. It is found that friction coefficients for a hydrogel decreases with increasing mesh size; friction coefficients are lowest for the slowest sliding speeds and remain approximately constant at a value (designated as $\mu_o$) as shown by dash lines in FIG. 2A, which depends upon the mesh size; transitions to speed dependent friction are observed to depend on mesh-size; and, above the transition speeds, the friction coefficient increases with increasing sliding speed. These trends are captured by a simple scaling law, $\mu=\mu_o+aV_s^p$, though the transition regime could not be reached for the hydrogels with the highest polymer concentration and lowest mesh size, as shown in FIG. 2A. Gemini hydrogel interfaces can provide exceptionally low friction coefficients under conditions traditionally not thought to promote lubrication, namely, low contact pressure and low sliding speed. Samples with the largest mesh size, for example ξ=9.4±1.1 nm, described below in Example 1 of this application, exhibits the lowest measured friction coefficients (μ~0.005), and maintained this behavior over a range of sliding speed from V=30 to 1,000 μm s$^{-1}$.

In a hydrogel, polymer relaxation time is given by $\tau=\xi^3 \eta/k_B T$, where $\xi$ is the polymer mesh size, $\eta$ is the viscosity of water, $k_B$ is Boltzmann's constant and T is the temperature. Mesh size measured by SAXS indicated that for the hydrogels studied, relaxation time varies between $5.3 \times 10^{-4}$ and 0.27 µs. At the surface, characteristic length-scales between polymer chains are roughly equal to the mesh size $\xi$, and a transition in friction behavior should occur when the relaxation time, $\tau$, is equal to the time it takes for the surface polymer chains to traverse one mesh size, $\xi/V^*$. Solving for the transition speed, $V^*$, gives $V^*=\xi/\tau$ or $V^*=k_B T/\xi^2 \eta$. Empirically, this simple scaling law predicts the transition speed, $V^*$, for all cases in which a transition in friction coefficient behavior is observed.

Figure 2B:
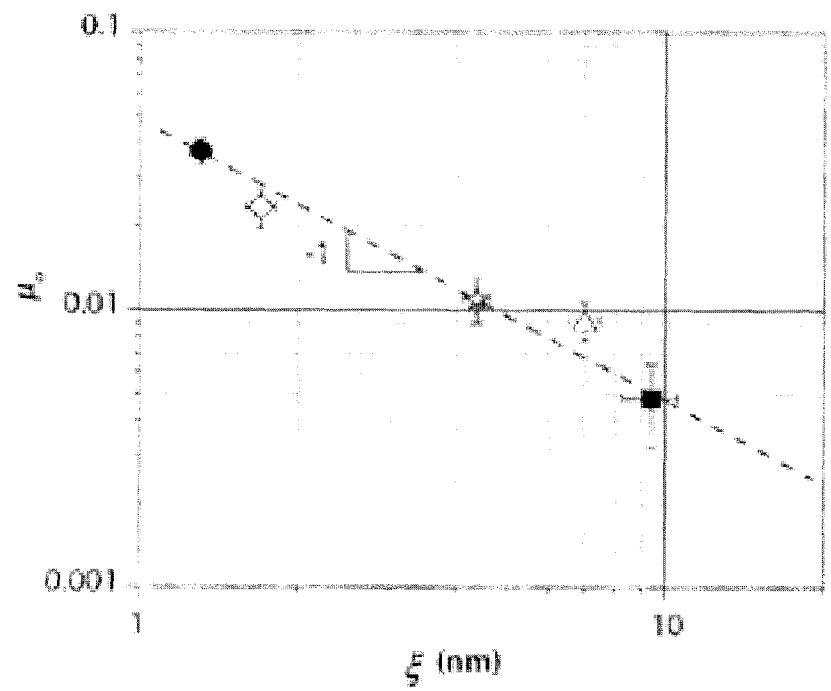
FIG. 2B shows plots of friction coefficients in the speed independent regime, $\mu_o$, which scales with mesh size to −1 power for each of the five samples.
Figure 2C:
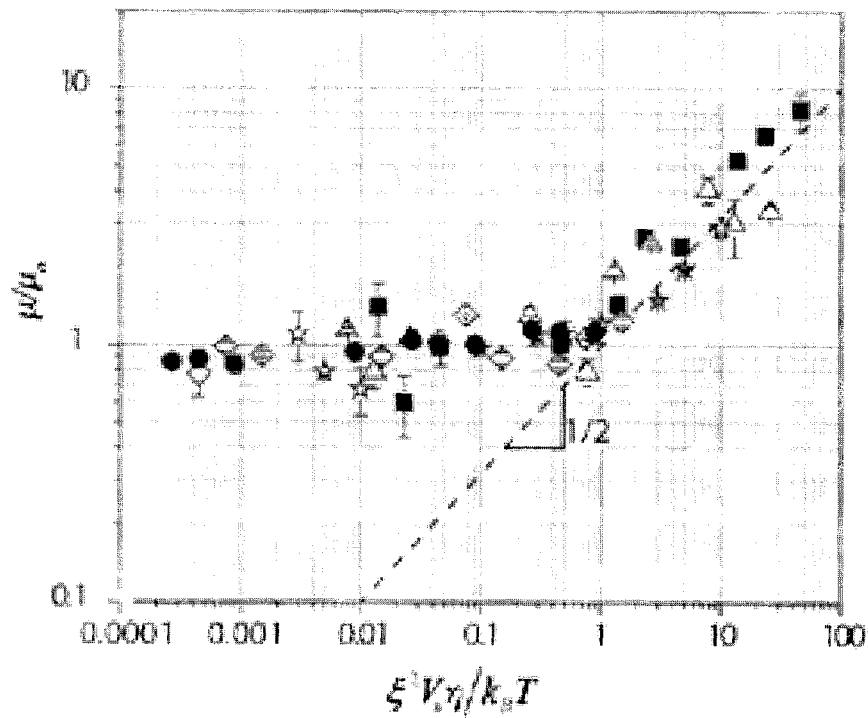
FIG. 2C shows a plot of friction coefficients as a universal curve that illustrates the transition in friction behavior between the speed-independent and the speed-dependent friction regimes where, in the speed-dependent regime, normalized friction coefficient scales with the ½ power.

When the sliding speed, $V_s$, is rescaled by $V^*=k_B T/\xi^2 \eta$ the resulting dimensionless group is $\psi=\xi^2 \eta V_s/k_B T$. Remarkably, when the friction coefficient is normalized by $\mu_o$, and plotted versus the dimensionless speed parameter, all datasets collapse to a single universal curve, as shown in FIG. 2C. The crossover from a low-speed behavior to a high-speed behavior in friction can be mechanistically envisioned as a competition between thermal fluctuations and non-Newtonian shear. At low speeds, the non-Newtonian shear effects are negligible and thermal fluctuation processes likely dominate the lubrication mechanism. Conversely, at high speeds the dominant process involves non-Newtonian mechanics of shearing across the sliding interface and the passing frequencies of the surface chains exceeds the fluctuation frequencies. Interestingly, the friction coefficient in the speed-independent regime, $\mu_o$, and the transition speed, $V^*$, both increase with increasing polymer concentration or decreasing mesh size. A plot of the friction coefficient in the speed-independent regime, $\mu_o$, versus mesh size, c, shows a roughly hyperbolic scaling, as shown in FIG. 2B.

The striking scaling of $\mu_o$ with $\xi$ provides clues about the origins of mesh size dependent friction. Hydrogels with increased polymer concentration have smaller mesh size, so it is sensible to hypothesize that friction coefficient should increase linearly with the number of polymer chains accessible to direct contact at the interface, $\mu_o \sim A c_s$, where A is contact area and $c_s$ is polymer surface concentration–the number of polymers at the surface per unit area. For a fixed normal load and indentation radius of curvature, $F_n=2$ mN and R=2 mm in experiments detailed below, the contact area varies from experiment to experiment, depending on the hydrogel elastic modulus, E. Using the Hertz force-indentation relation, the scaling between contact area and elastic modulus is $A \sim E^{-2/3}$. The elastic modulus of a semi-dilute hydrogel composed of flexible polymers scales with network mesh size like $E \sim \xi^{-3}$. The lowest-order estimate of the scaling between mesh size and surface concentration is $c_s \sim \xi^{-2}$, where doubling the linear length-scale, $\xi$, quadruples the characteristic area per mesh. The resulting prediction for friction coefficient is then $\mu_o \sim \xi^2 \xi^{-2} = \xi^0$. A more careful treatment follows analysis presented by de Gennes P G in the book entitled Scaling Concepts in Polymer Physics (Cornell University Press; 1979) where the classic treatments of semi-dilute gels of flexible polymers show that mesh size scales with volumetric polymer concentration like $\xi \sim c^{-4/3}$. The conversion between surface concentration predicts $c_s \sim \xi^{-8/9}$, and $\mu_o \sim \xi^2 \xi^{-8/9} = \xi^{10/9}$. Both predictions show that the hydrogel modulus scales strongly with mesh size, compared to surface chain concentration, such that the effects of contact area compensate or dominate the effects of surface chain density. Neither prediction captures our measurements of $\mu_o$ versus $\xi$ qualitatively, suggesting that the dominant frictional mechanism is not merely chain-chain contact.

It is believed that in equilibrium, the mesh size is determined by the statistical mechanics of chain fluctuations. Much like the Flory radius, $R_f$, or more generally speaking, the RMS end-to-end distance for free chains, the mesh size is not only a characteristic structural length scale, but is also approximately the amplitude of dynamic chain fluctuation. Thus polymer chains at a hydrogel surface of larger mesh size will fluctuate with increased amplitudes. The random thermal fluctuations of polymers at the Gemini interface rapidly relax shear strain generated during sliding, and, similar to the mechanism underlying thermolubricity, provide a blurred interface over which the barriers to sliding are effectively reduced. The reciprocal scaling of low speed friction coefficient, $\mu_o$, with $\xi$ highlights the dominating effect of polymer fluctuation amplitude in frictional interactions at the Gemini interface. Moreover, extrapolating these measurements to a mesh size of only a few Å, which would describe a solid acrylic material with minimal dynamic fluctuations, gives $\mu_o=0.8$, consistent with dry sliding friction.

Based on the discovery that there exists a relationship between the mesh size of the hydrogel network and the friction coefficient in a speed-independent regime, the inventors believed that the lubricity of a hydrogel material can be controlled and characterized by its mesh size. Mesh size control of lubricity in hydrogels can be used in the development and production of biomedical devices, in particular, contact lenses to achieve higher comfort during daily wear in the eye.

The ease with which hydrogels are synthesized and molded makes a vast breadth of tunable parameters and physical processes accessible to experiments, facilitating studies without the challenges that come with measuring real tissue samples, whether performed in vivo or ex vivo. Natural lubricious surfaces are usually made from semi-dilute networks of flexible anionic polymers, including proteoglycans, for example, lubricin, or glycosaminoglycans, for example, hyaluronic acid and mucin. These networks may be stabilized by multivalent cationic counterions or cationic proteins, like $Ca^{2+}$ and lysozyme, which act like ionic crosslinkers. In the outer layers of cartilage, the mesh size of these networks is approximately 2-6 nm, which lies within the range of mesh sizes disclosed herein for polyacrylamide gels. As the low-speed friction coefficient of polyacrylamide, $\mu_o$, is near that typically reported for cartilage, between 0.01 and 0.02, a transition to higher friction coefficient will occur in vivo between 10 and 100 mm $s^{-1}$, controlled by the polymer relaxation time. The rate that the eyelid slides past the cornea during a blink as well as the upper limit on sliding speeds in articulating joints fall within this range, and above about 100 mm $s^{-1}$, hydrodynamic lubrication should separate the surfaces using a hydrogel comprising contact lens where the frictional coefficient $\mu_o$, is similar to that of cartilage and the inner surface of the eyelid and the contact lens behave as a quasi-Gemini hydrogel interface.

The development and production of contact lenses (especially silicone hydrogel contact lenses) with a highly lubricious surface could benefit greatly from use of mesh size determination for selection a lens formulation for forming silicone hydrogel contact lenses having a targeted lubricity (as measured by mesh size) of a coating material and formation of a coating on a contact lens without undue reliance on clinical trials. While one cannot eliminate such clinical trials, better predictive models will streamline selection processes of lens forming materials or coating materials by reducing the number of different options to be tested. They would also provide a means for distinguishing useful and beneficial lens forming materials and curing conditions from lens forming materials and curing conditions that are not so useful or beneficial for obtaining silicone hydrogel contact lenses with a highly lubricious coating during development and production of contact lenses, or useful and beneficial coating materials and coating conditions from coating materials and coating conditions that are not so useful or beneficial for obtaining a highly lubricious coating during development and production of contact lenses.

Figure 4A:
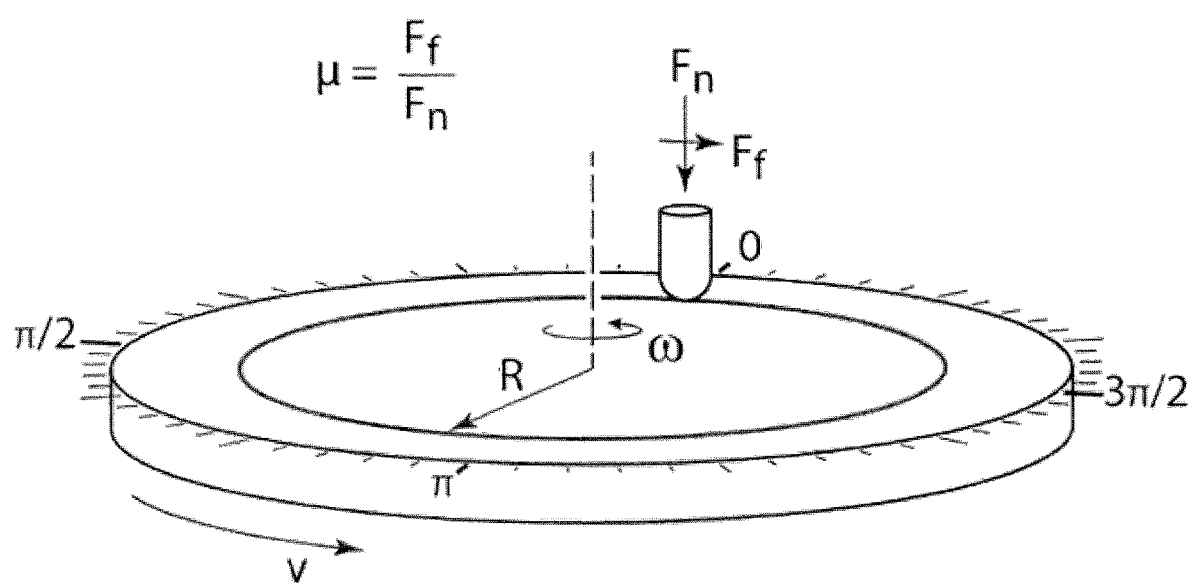
FIG. 4A shows a drawing of the Gemini hydrogel configuration consists of a hydrogel probe (4 mm diameter, 2 mm radius of curvature) mounted to a cantilever, slid against a rotating hydrogel disk.
Figure 4B:
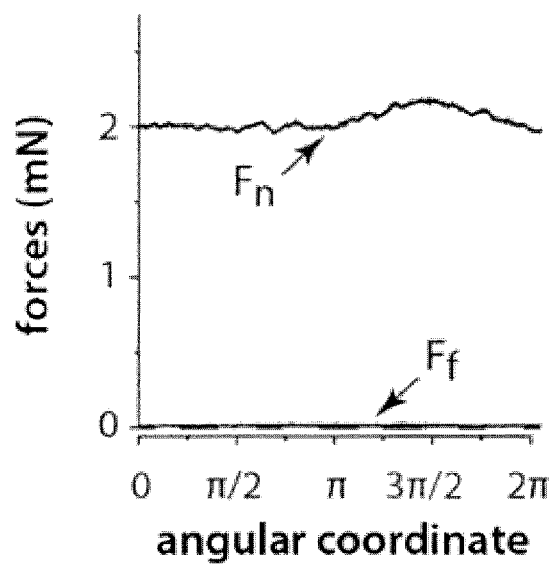
FIG. 4B shows a plot of capacitance sensor measured deflections of the cantilever of output normal ($F_n$) for a representative cycle of (1 revolution) and friction ($F_f$) forces.
Figure 4C:
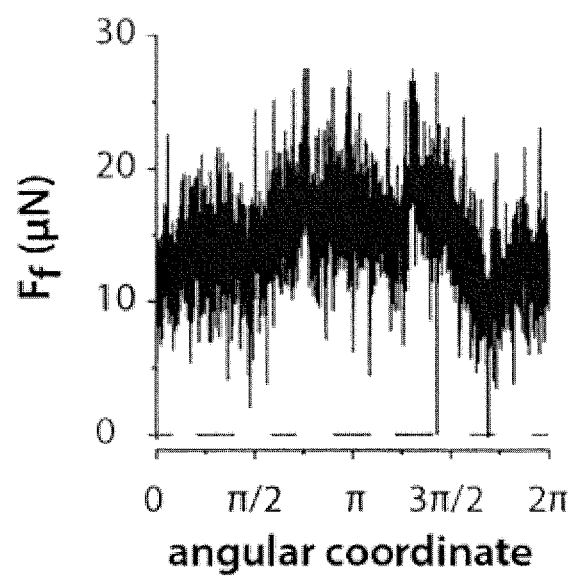
FIG. 4C shows a plot of capacitance sensor measured deflections of the cantilever of friction ($F_f$) forces displayed on a scale which is two orders of magnitude lower than that of FIG. 4B.

As indicated by FIGS. 4A, 4B and 4C, a hydrogel that has a target mesh size of at least about 4.4 nm, would have a lubricity (CoF or $\mu_o$~0.011) comparable to that reported for cartilage (i.e., CoF or $\mu_o$~0.01 to 0.02). In order to achieve improved wearing comfort, a hydrogel contact lens would have a surface layer of a hydrogel that has a mesh size of at least about 4.4 nm. One can also control the mesh size of the surface hydrogel of a contact lens to have a targeted lubricity.

The invention, in one aspect, provides a method for producing biomedical devices (preferably contact lenses) according to procedure (I) or (II), wherein procedure (I) comprises the steps of: (a) obtaining preformed biomedical devices made of a first hydrogel; (b) selecting a surface treatment or a combination of two or more surface treatments, coating materials, and coating conditions under which the selected coating materials can be applied onto a preformed biomedical device according to the selected surface treatment or the selected combination the two or more surface treatments to obtain a coated biomedical device having a coating of a second hydrogel thereon, wherein the second hydrogel is a non-silicone hydrogel and has a first targeted surface mesh size of at least 4.5 nm (preferably at least 4.7 nm, more preferably about 5.0 nm, even more preferably at least about 6.0 nm, most preferably at least about 8 nm); and (c) applying the selected coating materials onto the preformed biomedical devices under the selected coating conditions to form the biomedical devices each having a coating of the second hydrogel having the first targeted surface mesh size, wherein procedure (II) comprises the steps of: (a) selecting a mold material for making molds; (b) selecting a polymerizable formulation and curing conditions under which the selected polymerizable composition can be cured in the selected mold under the selected curing conditions to form a biomedical device of a third hydrogel, wherein the third hydrogel has a second targeted surface mesh size of at least 4.5 nm (preferably at least 4.7 nm, more preferably about 5.0 nm, even more preferably at least about 6.0 nm, most preferably at least about 8 nm); and (c) introducing and curing the selected polymerizable formulation in the molds to form the biomedical devices each having the second targeted surface mesh size.

In a preferred embodiment, the second and third hydrogels independently of each other have a targeted water-break-up time of at least about 10 seconds (preferably at least about 15 seconds, more preferably at least about 20 seconds, even more preferably at least about 25 seconds) and a targeted water contact angle of about 100 degrees or less (preferably about 90 degrees or less, more preferably about 80 degrees or less, even more preferably about 70 degrees or less).

In accordance with the invention, a preformed biomedical device (preferably a preformed contact lens) refers to a biomedical device (preferably contact lens) that has not been subjected to any surface modification posterior to the device-forming (or lens-forming) process well known to a person skilled in the art, i.e., a biomedical device without a coating thereon.

For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses. In cast-molding, a lens formulation typically is dispensed into molds and cured (i.e., polymerized and/or crosslinked) in molds for making contact lenses.

For production of preformed hydrogel contact lenses, a hydrogel lens formulation typically is: either (1) a monomer mixture comprising (a) at least one hydrophilic vinylic monomer and (b) at least one component selected from the group consisting of a vinylic crosslinking agent, a hydrophobic vinylic monomer, an internal wetting agent, a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a vinylic crosslinking agent, a hydrophobic vinylic monomer, an internal wetting agent, a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that an internal wetting agent present in a hydrogel lens formulation can improve the hydrophilicity (as measured by water-break-up-time, WBUT) and/or wettability (as measured by water contact angle, WCA) of preformed hydrogel contact lenses compared to those of control preformed hydrogel contact lenses obtained from a control hydrogel lens formulation without the internal wetting agent.

For production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a vinylic crosslinking agent, a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, internal wetting agents, leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art. It is understood that an internal wetting agent present in a SiHy lens formulation can improve the hydrophilicity and/or wetability of preformed SiHy contact lenses compared to those of control preformed SiHy contact lenses obtained from a control SiHy lens formulation without the internal wetting agent.

Numerous SiHy lens formulations have been described in numerous patents and patent applications published by the filing date of this application. All of them can be used in obtaining a preformed SiHy lens which in turn becomes the inner layer of a SiHy contact lens of the invention, so long as they will yield a SiHy material free of carboxyl group(s). A Silly lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, smafilcon B, smafilcon C, enfilcon A, and efrofilcon A can also be used in making preformed SiHy contact lenses.

Any suitable hydrophilic vinylic monomers can be used in the invention. Examples of preferred hydrophilic vinylic monomers include without limitation (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a weight average molecular weight of up to 1500, (meth)acrylic acid, and mixtures thereof. Preferably, a polymerizable composition comprises at least about 25% by weight of one or more hydrophilic vinylic monomers listed above.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Examples of preferred vinylic crosslinking agents include without limitation di-(meth)acrylate-terminated polyethylene glycol, di-(meth)acrylate-terminated polyoxyethylene-polyoxypropylene block copolymer, tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylacrylate, N-allyl-methacrylamide, N-allyl-acrylamide, 1,3-bis(methacrylamidopropyl)-1,1,3,3-tetrakis(trimethyl-siloxy)disiloxane, N,N'-methylenebisacrylamide, N,N'-methylenebismethacrylamide, N,N'-ethylenebisacrylamide, N,N'-ethylenebismethacrylamide, 1,3-bis(N-methacrylamidopropyl)-1,1,3,3-tetrakis-(trimethylsiloxy) disiloxane, 1,3-bis(methacrylamidobutyl)-1,1,3,3-tetrakis (trimethylsiloxy)-disiloxane, 1,3-bis(acrylamidopropyl)-1,1,3,3-tetrakis(trimethylsiloxy)-disiloxane, 1,3-bis (methacryloxyethylureidopropyl)-1,1,3,3-tetrakis (trimethylsiloxy)disiloxane, and combinations thereof. A preferred cross-linking agent is di-(meth)acrylate-terminated polyethylene glycol, di-(meth)acrylate-terminated polyoxyethylene-polyoxypropylene block copolymer, tetra (ethyleneglycol) diacrylate, tri(ethyleneglycol) diacrylate, ethyleneglycol diacrylate, di(ethyleneglycol) diacrylate, methylenebisacrylamide, triallyl isocyanurate, allyl (meth) acrylate, or triallyl cyanurate. The amount of a cross-linking agent used is expressed in the weight content with respect to the total polymer and is preferably in the range from about 0.05% to about 3% (more preferably from about 0.1% to about 2%).

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethylthio-carbonyl-aminoethyl-methacrylate, isobornyl methacrylate, trifluoroethyl methacrylate, hexafluoro-isopropyl methacrylate, hexafluorobutyl methacrylate.

Any suitable silicone-containing vinylic monomers can be used in the invention. Preferred silicone-containing vinylic monomers are three classes of vinylic monomers: a class of vinylic monomers each having a tris(trialkylsilyloxy)silylalkyl group, another class of vinylic monomers each having a bis(trialkylsilyloxy)alkylsilylalkyl group, and a further class of vinylic monomers each having a polysiloxane segment of

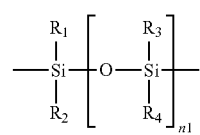

in which n1 is an integer of from 2 to 100, $R_1$, $R_2$, $R_3$, and $R_4$ independently of one another are a $C_1$-$C_{10}$ alkyl or $C_6$-$C_{18}$ aryl radical.

Examples of these three classes of preferred silicone-containing vinylic monomers include without limitation N-[tris(trimethylsiloxy)silylpropyl] (meth)acrylamide, N-[tris(dimethylpropylsiloxy)silylpropyl] (meth)acrylamide, N-[tris(dimethylphenylsiloxy)silyl-propyl] (meth)acrylamide, N-[tris(dimethylethylsiloxy)silylpropyl] (meth) acrylamide, N-[methylbis(trimethylsiloxy)silyl]propyl (meth)acrylamide, N-methyl-N-[methyl-bis(trimethylsiloxy)silyl]propyl (meth)acrylamide N-(2-hydroxy-3-(3-(bis (trimethylsilyloxy)-methylsilyl)propyloxy)propyl)-2-methyl acrylamide; N-(2-hydroxy-3-(3-(bis (trimethylsilyloxy)-methylsilyl)propyloxy)propyl) acrylamide; N,N-bis[2-hydroxy-3-(3-(bis(trimethylsilyloxy)-methylsilyl)propyloxy)propyl]-2-methyl acrylamide; N,N-bis[2-hydroxy-3-(3-(bis(trimethylsilyloxy)-methylsilyl)propyloxy)propyl] acrylamide; N-(2-hydroxy-3-(3-(tris (trimethylsilyloxy)silyl)-propyloxy)propyl)-2-methyl acrylamide; N-(2-hydroxy-3-(3-(tris(trimethylsilyloxy)silyl) propyloxy)-propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl] acrylamide; N-[2-hydroxy-3-(3-(t-butyl-dimethylsilyl)propyloxy)propyl]-2-methyl acrylamide; N-[2-hydroxy-3-(3-(t-butyldimethylsilyl)-propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy) propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis (trimethylsiloxy)-methylsilane), (3-methacryloxy-2-hydroxypropyloxy)propyltris(trimethylsiloxy)silane, 3-methacryloxy-2-(2-hydroxyethoxy)-propyloxy)propylbis (trimethylsiloxy)methylsilane, N-2-methacryloxyethyl-O-(methyl-bis-trimethylsiloxy-3-propyl)silyl carbamate, 3-(trimethylsilyl)-propylvinyl carbonate, 3-(vinyloxycarbonylthio)propyl-tris(trimethyl-siloxy)silane, 3-[tris(trimethyl-siloxy)silyl]propylvinyl carbamate, 3-[tris(trimethylsiloxy)silyl] propyl allyl carbamate, 3-[tris(trimethylsiloxy) silyl]propyl vinyl carbonate, t-butyldimethyl-siloxyethyl vinyl carbonate; trimethylsilylethyl vinyl carbonate, and trimethylsilylmethyl vinyl carbonate; mono-(meth)acryloyl-terminated, mono-$C_1$-$C_4$ alkyl-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); mono-vinylcarbonate-terminated, mono-$C_1$-$C_4$ alkyl-terminated polydimethylsiloxanes; mono-vinylcarbamate-terminated, mono-$C_1$-$C_4$ alkyl-terminated polydimethylsiloxane; mono-methacrylamide-terminated, mono-$C_1$-$C_4$ alkyl-terminated polydimethylsiloxanes; mono-acrylamide-terminated, mono-$C_1$-$C_4$ alkyl-terminated polydimethylsiloxanes; combinations thereof.

Any suitable silicone-containing vinylic macromer can be used in the invention.

Preferred silicone-containing vinylic macromers are polysiloxane vinylic macromers (or crosslinkers) having a polysiloxane segment of

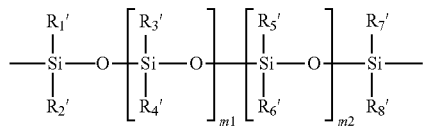

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, $C_5$-$C_{30}$ organic radical having one or more hydroxyl groups, -alk-$(OC_2H_4)_{m3}$—OR' (in which alk is $C_1$-$C_6$ alkyl diradical, R is H or $C_1$-$C_4$ alkyl and m3 is an integer from 1 to 10), or a linear hydrophilic polymer chain.

Examples of preferred polysiloxane vinylic macromers (or crosslinkers) are di-(meth)acrylate-terminated polydimethylsiloxanes of various molecular weight; di-vinyl carbonate-terminated polydimethylsiloxanes; di-vinyl carbamate-terminated polydimethylsiloxane; di-(meth)acrylamide-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100; chain-extended polysiloxabe vinylic crosslinkers disclosed in US201008843A1 and US20120088844A1; the reaction products of glycidyl methacrylate with amino-functional polydimethylsiloxanes, hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

Any suitable UV-absorbing vinylic monomers can be used in the invention. Examples of preferred UV-absorbing and UV/HEVL-absorbing, benzotriazole-containing vinylic monomers include without limitation: 2-(2-hydroxy-5-vinylphenyl)-2H-benzotriazole, 2-(2-hydroxy-5-acryloyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-(2'-hydroxy-5'-methacryloxyethylphenyl) benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-5- methoxy-2H-benzotriazole (UV 13), 2-[2'-Hydroxy-3'-tert-butyl-5'-(3'-acryloyloxypropoxy)phenyl]-5-trifluoromethyl-2H-benzotriazole (CF$_3$-UV13), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, a lens formulation comprises from about 0.2% to about 5.0%, preferably from about 0.3% to about 2.5%, more preferably from about 0.5% to about 1.8%, by weight of a UV-absorbing agent.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329. The polymerization can then be triggered off by actinic radiation, for example light, in particular UV light of a suitable wavelength. The spectral requirements can be controlled accordingly, if appropriate, by addition of suitable photosensitizers.

In this application, an internal wetting agent refers to a chemical that is incorporated in a lens formulation and can improve the hydrophilicity and/or wetability of contact lenses made from the lens formulation, compared to those of control contact lenses made from a control lens formulation without the internal wetting agent. Internal wetting agents can be polymerizable or non-polymerizable (i.e., leachable).

A polymerizable internal wetting agent refers to any polymerizable components in a lens formulation for rendering resultant lenses wettable and hydrophilic. Any polymerizable internal wetting agents can be used in the invention.

One class of exemplary polymerizable internal wetting agents is N-vinyl type hydrophilic vinylic monomers which have tendencies to be polymerize in the lens formulation to form, in situ, homopolymers, homopolymer chains, homopolymer segments, or combinations thereof. Those in situ formed homopolymers, homopolymer chains, and/or homopolymer segments can render resultant contact lenses wettable and hydrophilic, as shown by examples described in U.S. Pat. Nos. 6,867,245, 7,268,198, 7,540,609, 7,572,841, 8,703,891, 8,865,789, 8,937,110, and 8,937,111). Examples of preferred N-vinyl type monomers include without limitation N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, or combinations thereof (preferably N-vinylpyrrolidone, N-vinyl acetamide, N-vinyl-N-methyl acetamide, or combinations thereof).

Another class of exemplary polymerizable internal wetting agents is hydrophilic polymers that comprise one sole ethylenically unsaturated group. Such polymerizable hydrophilic polymers can be incorporated into the polymer matrix of a resultant contact lens as pendant (dangling) polymer chains that can improve the wettability and hydrophilicity of the resultant contact lens. Any homopolymers or copolymers of a hydrophilic vinylic monomer described above can be used in the invention.

A further class of exemplary polymerizable internal wetting agents is polysiloxane crosslinkers having pendant hydrophilic polymer chains, such as those disclosed in U.S. Pat. Nos. 8,129,442, 8,048,968, 8,404,759, 8,524,850, and 8,835,525 and in US. Pat. Appl. Pub. Nos. 2012/0088861 and 2014/01741543.

Examples of leachable (i.e., non-polymerizable) internal wetting agents are non-polymerizable hydrophilic polymers (i.e., without ethylenically unsaturated groups) having a weight average molecular weight greater than 5,000 Daltons, as shown by examples described in U.S. Pat. No. 6,367,929. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a polymerizable composition can be a solution or a melt at a temperature from about 20° C. to about 85° C. Preferably, a polymerizable composition is a solution of all desirable components in a suitable solvent, or a mixture of suitable solvents, or a solventless liquid mixture.

A lens formulation can be prepared by blending all the desirable components to form a solventless lens formulation, or by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Where a lens formulation is a solventless clear liquid mixture, it preferably comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethyl-styrene (TMS), and t-butyl styrene (TBS), and combinations thereof. Preferably, the blending vinylic monomer is methylmethacrylate.

In a preferred embodiment, a lens formulation is a solution of all the desirable components dissolved in 1,2-propylene glycol, a polyethyleneglycol having a molecular weight of about 400 Daltons or less, or a mixture thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire. Polar plastic molds can preferably be used to produce silicone hydrogel contact lenses having a much better wettability than non-polar plastic molds (e.g., polypropylene molds) (see, Lai and Friends, "Surface Wettability Enhancement of Silicone Hydrogel Lenses by Processing with Polar Plastic Molds", *J. Biomed. Mat. Res.* 35(3): 349-356 (1997); U.S. Pat. No. 5,352,714).

Reusable molds can also be used and the lens formulation is cured actinically under a spatial limitation of actinic radiation to form a contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from Sabic Global, PrimoSpire®, etc.

In accordance with the invention, a lens formulation can be introduced (dispensed) into a cavity formed by a mold according to any known methods.

After the lens formulation is dispensed into the mold, it is polymerized to produce a contact lens. Polymerization may be initiated thermally or actinically, preferably by exposing the lens formulation in the mold to a spatial limitation of actinic radiation to crosslink the polymerizable components in the lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

Any coating materials can be used alone or in any combinations in any manner according to any surface treatments in the invention so long as they can be used to form a coating of a hydrogel having a targeted surface mesh size.

Any suitable surface treatments can be used in the invention. Examples of surface treatments include: without limitation, plasma treatments; chemical treatments; chemical vapor depositions; the graft-polymerization of hydrophilic vinylic monomers and/or macromers onto the surface (modified or unmodified) of an article; layer-by-layer ("LbL") deposition of one or more hydrophilic materials on the surface (modified or unmodified) of an article (i.e., a process for forming an LbL coating); covalently attachment of one or more hydrophilic polymeric materials onto the surface (modified or unmodified) of an article; or combinations thereof.

A plasma treatment refers to a process in which a contact lens is exposed to a plasma to chemically modify the surface of the contact lens. The term "plasma" denotes an ionized gas (e.g., created by electric glow discharge which may be composed of electrons, ions of either polarity, gas atoms and molecules in the ground or any higher state of any form of excitation, as well as of photons). The excited species interact with solid surfaces of an article placed in the plasma, resulting in the chemical and physical modification of the material surface. Where a plasma is generated by subjecting a gas in a vacuum chamber to an electric charge typically at radio frequency (rf) (or at a microwave or other frequency), it is often called "low temperature plasma". Where a plasma is generated by an atmospheric discharge (e.g., arc discharge) and sustained at a surrounding atmospheric pressure, it is a "high temperature plasma" or "atmospheric plasma". Atmospheric plasma can be produced by atmospheric pressure discharges.

For a review of plasma treatment and its uses reference is made to R. Hartmann "Plasma polymerisation: Grundlagen, Technik und Anwendung, Jahrb. Oberflächentechnik (1993) 49, pp. 283-296, Battelle-Inst. E.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (1986); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

The known plasma treatment under low pressure includes plasma deposition, plasma-induced polymerization, plasma grafting, plasma oxidation, and the likes. Plasma treatment under low pressure haven been used in commercial products, for example, such as, Focus NIGHT & DAY® and AIRPTIX® (Alcon), and PUREVISION® (Bausch & Lomb). Advantages of a plasma coating, such as, e.g., those may be found with Focus NIGHT & DAY®, are its durability, relatively high hydrophilicity/wettability), and low susceptibility to lipid and protein deposition and adsorption. Examples of plasma treatment are those disclosed in U.S. Pat. Nos. 4,143,949; 4,312,575; 5,464,667, 6,881,269; and 7,078,074. It is understood that a preformed contact lenses must typically be dried before a plasma treatment under low pressure.

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency).

As an illustrated example of plasma treatment under low pressure of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Low pressure plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988)), a batch low-pressure-plasma treatment system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 a linear low-pressure-plasma system.

In accordance with the invention, the preformed contact lens in a dried state is treated with a low-pressure plasma generated in a plasma gas (i.e., an atmosphere) compose of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof (preferably $CO_2$ or a mixture of a $C_1$-$C_4$ hydrocarbon and a secondary gas selected from the group consisting of air, $CO_2$, $N_2$, and combinations thereof, more preferably $CO_2$ or a mixture of methane and a secondary gas selected from the group consisting of air, $CO_2$, $N_2$, and combinations thereof, even more preferably $CO_2$ or a mixture of methane and $CO_2$).

Atmospheric plasma surface treatment disclosed in U.S. Pat. No. 9,156,213 is preferably used in the invention. For the atmospheric plasma surface treatment, contact lenses can be in a fully hydrated state.

Although plasma surface treatment can render a silicone hydrogel contact lens wettable, it is unlikely to provide a good lubricity and surface hydrophilicity (as measured by water-break-up-time, WBUT). It would be desirable that a plasma coating is used as a prime coating for further surface modifications, such as, deposing one or more layers of one or more hydrophilic polymers (i.e., LbL coating), covalently attaching a layer of one or more hydrophilic polymers, graft-polymerization of one or more hydrophilic vinylic monomers and/or macromers on the surface of a contact lens, or combinations thereof, to obtain a coating of hydrogel having a targeted surface mesh size.

"LbL coating", as used herein, refers to a coating that is not covalently attached to the polymer matrix of a contact lens and is obtained through a layer-by-layer ("LbL") deposition of one or more hydrophilic materials on the lens. An LbL coating can be composed of one or more layers. LbL coatings on contact lenses can be obtained according to methods described in U.S. Pat. Nos. 6,451,871, 6,719,929, 6,793,973, 6,811,805, 6,896,926, 8,044,112, 8,158,192, and 8147897. Preferably, an LbL coating comprises at least one layer of one or more polyanionic polymers each comprising carboxyl groups. The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer which is polyacrylic acid, polymethacrylic acid, poly(acrylic acid-co-methacrylic acid), or a mixture thereof.

An LbL coating of a polyanionic polymer having carboxyl groups can be form on a contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying—and dipping—steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polyanionic polymer for forming an LbL coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent. It is believed that a solvent system containing at least one organic solvent can swell a contact lens so that a portion of the reactive polymer may penetrate into the contact lens and increase the durability of the coating. Examples of organic solvents are described above. The pH of the polyanionic polymer solution is preferably from about 1.5 to about 4.0 to form a relatively-thick and stable LbL coating. The temperature of the coating solution is preferably from about 20° C. to about 70° C.

Although an LbL coating can render a silicone hydrogel contact lens wettable, hydrophilic and optionally lubricious, it may not be durable. It would be desirable that an LbL coating is crosslinked with a crosslinker to convert it into a hydrogel coating having a targeted mesh size, or that an LbL coating is used as a prime coating for further surface modifications, such as, covalently attaching a layer of one or more hydrophilic polymers, graft-polymerization of one or more hydrophilic vinylic monomers and/or macromers on the surface of a contact lens, or combinations thereof, to obtain a coating of hydrogel having a targeted surface mesh size.

A person skilled in the art knows how to covalently attach one or more hydrophilic polymers onto the surface of a contact lens. Exemplary methods for covalently attaching one or more hydrophilic polymers onto a medical device are disclosed in U.S. Pat. Nos. 5,599,576, 5,766,158, 6,087,415, 6,096,726, 6,340,465, 6,440,571, 6,500,481, 6,534,559, 6,623,747, 6,683,062, 6,838,491, 6,866,936, 6,923,978, and 8,529,057 and in U.S. Pat. Appl. Pub. Nos. 2009-0145086A1, 2009-0145091A1, 2008-0142038A1, and 2007-0122540A1.

Graft-polymerization of one more hydrophilic vinylic monomers (any one selected from the list of hydrophilic vinylic monomers described above, preferably one or more hydrophilic vinylic monomers selected from the group consisting of (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth) acrylamide hydrochloride, aminoethyl methacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a weight average molecular weight of up to 1500, (meth)acrylic acid, and mixtures thereof) in the presence or absence of a hydrophilic crosslinking agent (preferably selected from the group consisting of di-(meth)acrylate-terminated polyethylene glycol, di-(meth)acrylate-terminated polyoxyethylene-polyoxypropylene block copolymer, ethylene glycol tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, triallyl cyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and combinations thereof) to form a hydrophilic polymer coating are described in numerous patents, for example, in U.S. Pat. Nos. 6,099,122, 6,436,481, 6,440,571, 6,447,920, 6,465,056, 6,521,352, 6,586,038, 6,730,366, 6,734,321, 6,835,410, and 6,878,399 and in JP2001075060.

It should be understood that two or more surface treatments can be combined to obtain a desirably hydrogel coating on a contact lens.

In a preferred embodiment, a desirably hydrogel coating comprises a reactive base coating having reactive functional groups and a top hydrogel coating on top of the reactive base coating. The reactive base coating can be formed by using one or more surface treatments. For example, a reactive base coating can be: an LbL coating, a plasma coating, combination of a plasma coating and an LbL coating thereon; a layer of one or more hydrophilic polymers obtained by covalently attachment or graft polymerization; combination of a layer of one or more hydrophilic polymers and an LbL coating thereon; or combination of plasma coating, a layer of one more hydrophilic polymers on top of the plasma coating, and an LbL coating on top of the layer of one or more hydrophilic polymers. The hydrogel top coating is preferably obtained by heating a contact lens with a reactive base coating thereon in a solution comprising a water-soluble and thermally-crosslinkable hydrophilic polymeric material having azetidinium groups and optionally (but preferably) thiol, amino or carboxyl groups, at a temperature of from about 60° C. to about 140° C. for a time period sufficient long to crosslink the water-soluble thermally-crosslinkable hydrophilic polymeric material and the base coating so as to form a hydrogel coating on the contact lens. A water-soluble and thermally-crosslinkable hydrophilic polymeric material is preferably a poly(2-oxazoline-co-ethyleneimine)-epichlorohydrin, a chemically-modified poly (2-oxazoline-co-ethyleneimine)-epichlorohydrin, a chemically-modified polyamidoamine-epichlorohydrin, or combinations thereof, wherein the chemically-modified poly (2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. Various hydrophilicity-enhancing agents are described in detail in U.S. Pat. No. 8,529,057 and can be used in this invention.

A person skilled in the art knows how to select a surface treatment or a combination of two or more surface treatments, coating materials and coating conditions under which the selected coating materials can be applied onto a contact lens according to the selected surface treatment or the selected combination of the two or more surface treatments to obtain a coated contact lens. The selected coating materials must be capable of being applied onto a contact lens (preferably hydrogel contact lens, more preferably silicone hydrogel contact lens) under the selected coating conditions according to the selected surface treatment or the selected combination of the two or more surface treatments to obtain a coated contact lens having a coating of a hydrogel having a first targeted surface mesh size, as determined according to the procedures described in Example 2. Preferably, design of experiments (DOE) is used in the selection process.

For example, where an LbL coating process is selected to form a reactive base coating on a contact lens, at least one linear or branched polyanionic polymer having a desired weight average molecular weight can be selected from the preferred list of polyanionic polymers described above or from the like materials, conditions to be selected include without limitation the concentration of the selected polyanionic polymer, a solvent (water, an organic solvent, a mixture of water and at least one organic solvent, or a mixture of two or more organic solvents, etc.), pH of the coating solution, coating temperature, the ionic strength of the coating solution, coating duration (from several second to several hours), dip-coating or spray-coating or combinations thereof, or combinations thereof.

Where a thermally-crosslinked coating process is selected to form a hydrophilic, crosslinked coating on top of a reactive LbL base coating, one can select a water-soluble thermally crosslinkable material and thermal crosslinking conditions under which a lubricious coating is formed on top the reactive LbL base coating. It is understood that the selected water-soluble, thermally-crosslinkable material must be form, under the selected coating conditions, a lubricious coating on a contact lens which must have a first targeted surface mesh size.

Where a reactive base coating is a plasma coating and the top coating is a crosslinked coating of a water-soluble thermally-crosslinkable material, one can select plasma coating material, a water-soluble thermally crosslinkable material, plasma coating conditions, and thermal crosslinking conditions, the combination of the selected coating materials and the coatings conditions should result in formation of a lubricious coating on a contact lens which must have a first targeted surface mesh size.

Where a reactive base coating is composed of a plasma coating and an LbL coating thereon and the top coating is a crosslinked coating of a water-soluble thermally-crosslinkable material, one can select plasma coating material, a polyanionic polymer, a water-soluble thermally crosslinkable material, plasma coating conditions, LbL coating conditions, and thermal crosslinking conditions, the combination of the selected coating materials and the coatings conditions should result in formation of a lubricious coating on a contact lens which must have a first targeted surface mesh size.

Where graft-polymerization coating process is selected to form a lubricious coating on a contact lens, one or more hydrophilic vinylic monomers and one or more hydrophilic vinylic crosslinking agents can be selected from the preferred lists of hydrophilic vinylic monomer and hydrophilic vinylic crosslinking agents described above, conditions to be selected include without limitation the concentrations of the selected hydrophilic vinylic monomers and the selected hydrophilic vinylic crosslinking agents, a solvent (water, an organic solvent, a mixture of water and at least one organic solvent, a radical initiator (e.g., an oxidizing or reducing agent, a thermal initiator, a photoinitiator, a reversible addition-fragmentation chain-transfer (RAFT) polymerization initiator, an atom-transfer radical-polymerization (ATRP) initiator, or combinations thereof) and the concentration thereof, a solvent, temperature, graft-polymerization duration (from several second to several hours), or combinations thereof. It is understood that the selected coating materials must be form, under the selected coating conditions, a lubricious coating on a contact lens which must have a first targeted surface mesh size.

Where a reactive base coating is a coating obtained according to graft-polymerization and the top coating is a crosslinked coating of a water-soluble thermally-crosslinkable material, one can select coating materials for graft-polymerization, a water-soluble thermally crosslinkable material, graft-polymerization conditions, and thermal crosslinking conditions, the combination of the selected coating materials and the coatings conditions should result in formation of a lubricious coating on a contact lens which must have a first targeted surface mesh size.

Where a reactive base coating is composed of a plasma coating and a coating of graft-polymerization thereon and the top coating is a crosslinked coating of a water-soluble thermally-crosslinkable material, one can select plasma coating material, graft-polymerization materials, a water-soluble thermally crosslinkable material, plasma coating conditions, graft-polymerization coating conditions, and thermal crosslinking conditions, the combination of the selected coating materials and the coatings conditions should result in formation of a lubricious coating on a contact lens which must have a first targeted surface mesh size.

It is understood that any combinations of known surface treatments can be used in the invention, so long as that resultant hydrogel surface has a targeted surface mesh size. In order to have a targeted surface mesh size, one can control the crosslinking density and distance between crosslinks by controlling the amounts and length of a crosslinking agent or crosslinker, the percentage of chain entanglement, free polymer chains each with one free loose end, the concentration and distribution of reactive groups in a thermally-crosslinkable material or a hydrophilic polymer, the reaction condition, or combination thereof. Preferably, the resultant non-silicone hydrogel from the combination of one or more surface treatments comprises: (1) repeating units of at least one vinylic monomer selected from the group consisting of (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a weight average molecular weight of up to 1500, (meth)acrylic acid, vinyl alcohol, a phosphorylcholine-containing vinylic monomer (e.g., (meth)acryloyloxyethyl phosphorylcholine), and mixtures thereof; (2) repeating units of at least one vinylic crosslinking agent selected from the group consisting of di-(meth)acrylate-terminated polyethylene glycol, di-(meth)acrylate-terminated polyoxyethylene-polyoxypropylene block copolymer, tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and mixture thereof; (3) polymer chain segments selected from the group consisting of polyoxyethylene segments, polyamidoamine segments, polyoxazoline segments, and mixtures thereof; (4) combinations thereof.

A person skilled in the art knows how to select a lens formulation (preferably a hydrogel lens formulation, more preferably a silicone hydrogel lens formulation) which is cured in the selected mold under the selected curing conditions to form a contact lens (preferably a hydrogel contact lens, more preferably a silicone hydrogel contact lens) having a surface layer of a third hydrogel having a second targeted surface mesh size (as determined according to the procedures described in Example 2). Preferably, design of experiments (DOE) is used in the selection process. The selected lens formulation must be capable of being cured in the selected mold under the selected curing conditions to obtain a contact lens having a surface layer of a third hydrogel having a second targeted surface mesh size (as determined according to the procedures described in Example 2).

For example, one can select a mold (made of a particular mold material, e.g., polar mold or non-polar mold); a lens formulation comprising one or more silicone-containing vinylic monomers and/or macromers, a hydrophilic vinylic monomer, at least one internal wetting agent (e.g., a polymerizable internal wetting agent, a non-polymerizable internal wetting agent, or combination thereof), at least one cross-linking agent, and optionally a solvent; the concentrations of the internal wetting agent; the curing method (thermal or photo curing); the curing time. The combination of the selected mold, the selected lens formulation, and the selected curing conditions must produce a contact lens having a surface layer of a third hydrogel having a second targeted surface mesh size.

A person skilled in the art knows how to introduce and cure a lens formulation in a lens mold to form a contact lens.

To control the surface mesh size of a hydrogel, one can adjust the concentration of a crosslinker or crosslinking agent, the length of a crosslinker or crosslinking agent, one or more non-polymerizable materials which can function as porogen (i.e., a chemical or material can be removed after molding to form microscopic pores to be filled with water in the hydrogel), a polymerizable hydrophilic polymer with one sole terminal vinyl group to provide increased percentage of dangling chains each with one free loose end, a high molecular weight hydrophilic polymer for forming interpenetrating and/or semi-penetrating networks (i.e., increasing the percentage of chain entanglement), vinylic monomers with different polymerizing reactivity for forming, in-situ, interpenetrating and/or semi-interpenetrating networks (i.e., increasing the percentage of chain entanglement). A person skilled in the art knows how to select a lens formulation (preferably a hydrogel lens formulation, more preferably a silicone hydrogel lens formulation) which is cured in the selected mold under the selected curing conditions to form a contact lens (preferably a hydrogel contact lens, more preferably a silicone hydrogel contact lens) having a surface layer of a third hydrogel having a second targeted surface mesh size (as determined according to the procedures described in Example 2). Preferably, design of experiments (DOE) is used in the selection process. The selected lens formulation must be capable of being cured in the selected mold under the selected curing conditions to obtain a contact lens having a surface layer of a third hydrogel having a second targeted surface mesh size (as determined according to the procedures described in Example 2).

In another aspect, the invention provides a method of manufacturing biomedical devices (preferably hydrogel contact lenses, more preferably silicone hydrogel contact lenses), comprising the step of: inspecting manufactured biomedical devices for having a targeted lubricity as measured by having a surface mesh size of at least 4.5 nm (preferably at least 4.7 nm, more preferably about 5.0 nm, even more preferably at least about 6.0 nm, most preferably at least about 8 nm); and discarding those contact lenses which do not have the targeted lubricity.

Preferably, the inspecting step is conducted by statistical sampling or conducted continuously on production line.

In general, manufactured contact lenses need to be inspected for defects, e.g., physical defects, and optic defects. In accordance with the invention, the inspection of defects can include also determining whether those manufactured contact lenses can also meet the criteria for having a targeted lubricity. Those lenses found to meet the criteria proceed to packaging for further processing and for commercial use; those lenses that do not are discarded.

The invention, in a further aspect, provides a biomedical device, comprising a surface layer of a hydrogel having a desired surface mesh size, such that the low-speed frictional coefficient is near or lower than that typically reported for cartilage (being about 0.01 or lower). Hydrogels comprising devices with low-speed frictional coefficients of about 0.01 or lower can be expected to reduce the friction that occurs between a hydrogel comprising device, a contact lens, and an epithelial cell tarsal conjunctiva and marginal conjunctiva of the eyelid.

In one embodiment, the biomedical device is a soft contact lens, which comprises a lens body of a silicone hydrogel material and a coating of a non-silicone hydrogel thereon, wherein the silicone hydrogel material comprises first repeating units of at least one hydrophilic vinylic monomer and second repeating units of (a) at least one silicone-containing vinylic monomer, (b) a silicone-containing vinylic macromer, or (c) a combination thereof, wherein the coating has a thickness of at least 20 nm (preferably at least about 100 nm, more preferably from about 0.1 µm to about 20 µm, even more preferably from about 0.25 µm to about 15 µm, most preferably from about 0.5 µm to about 10 µm), wherein the soft contact lens has a surface mesh size of either (1) from 4.5 nm to 10.6 nm or (2) at least 11 nm. Preferably, the soft contact lens has: an elastic modulus of from about 0.1 MPa to about 1.8 MPa (preferably from 0.2 MPa to about 1.2 MPa, more preferably from 0.3 MPa to about 1.0 MPa, even more preferably from 0.4 MPa to about 0.8 MPa) and a water content of from about 10% to about 80% by weight when fully hydrated.

In this application, a lens body in reference to a soft contact lens refers to a contact lens that is free of any coating thereon, namely a contact lens that has not been subjected to any surface modification posterior to the lens-forming process (e.g., molding) well known to a person skilled in the art; a device body in reference to a biomedical device refers to a biomedical device that is free of any coating thereon, namely a biomedical device that has not been subjected to any surface modification posterior to the device-forming process (e.g., molding) well known to a person skilled in the art.

In accordance with this embodiment of the invention, the silicone hydrogel material can further comprise repeating units of a hydrophobic vinylic monomer, a vinylic crosslinking agent, a polymerizable internal wetting agent, a UV-absorbing vinylic monomer, or combinations thereof. It can also comprise a non-polymerizable international wetting agent.

All the various embodiments including preferred embodiments, which are described above, of a hydrophilic vinylic monomer, a silicone-containing vinylic monomer, a silicone-containing vinylic macromer, a hydrophobic vinylic monomer, a vinylic crosslinking agent, a polymerizable internal wetting agent, a UV-absorbing vinylic monomer, and a non-polymerizable international wetting agent can be used in this embodiment of this aspect of the invention.

In another embodiment, the biomedical device is a soft contact lens, which comprises a lens body of a silicone hydrogel material, wherein the silicone hydrogel material comprises first repeating units of at least one hydrophilic vinylic monomer and second repeating units of (a) at least one silicone-containing vinylic monomer, (b) a silicone-containing vinylic macromer, or (c) a combination thereof, wherein the lens body comprises an internal wetting agent (for improving the hydrophilicity and wettability of the lens body), wherein the lens body: has a surface mesh size of at least 4.5 nm (preferably at least 4.7 nm, more preferably about 5.0 nm, even more preferably at least about 6.0 nm, most preferably at least about 8 nm); an elastic modulus of from about 0.1 MPa to about 1.8 MPa (preferably from 0.2 MPa to about 1.2 MPa, more preferably from 0.3 MPa to about 1.0 MPa, even more preferably from 0.4 MPa to about 0.8 MPa); a water content of from about 10% to about 80% by weight when fully hydrated; a water-break-up time of at least about 10 seconds (preferably at least about 15 seconds, more preferably at least about 20 seconds, even more preferably at least about 25 seconds); and a water contact angle of about 100 degrees or less (preferably about 90 degrees or less, more preferably about 80 degrees or less, even more preferably about 70 degrees or less).

In accordance with this embodiment of the invention, the silicone hydrogel material can further comprise repeating units of a hydrophobic vinylic monomer, a vinylic crosslinking agent, a UV-absorbing vinylic monomer, or combinations thereof; and the internal wetting agent can be a polymerizable internal wetting agent or a non-polymerizable internal wetting agent or both.

All the various embodiments including preferred embodiments, which are described above, of a hydrophilic vinylic monomer, a silicone-containing vinylic monomer, a silicone-containing vinylic macromer, a hydrophobic vinylic monomer, a vinylic crosslinking agent, a polymerizable internal wetting agent, a UV-absorbing vinylic monomer, and a non-polymerizable international wetting agent can be used in this embodiment of this aspect of the invention.

In a further embodiment, the biomedical device is a soft contact lens, which comprises a lens body of a non-silicone hydrogel material, wherein the non-silicone hydrogel material comprises repeating units of at least one hydrophilic vinylic monomer and is free of silicone-containing vinylic monomer or macromer, wherein the lens body: has a surface mesh size of at least 4.5 nm (preferably at least 4.7 nm, more preferably about 5.0 nm, even more preferably at least about 6.0 nm; an elastic modulus of from about 0.1 MPa to about 1.8 MPa (preferably from 0.2 MPa to about 1.2 MPa, more preferably from 0.3 MPa to about 1.0 MPa, even more preferably from 0.4 MPa to about 0.8 MPa); a water content of from about 25% to about 85% by weight when fully hydrated; a water-break-up time of at least about 10 seconds (preferably at least about 15 seconds, more preferably at least about 20 seconds, even more preferably at least about 25 seconds); and a water contact angle of about 100 degrees or less (preferably about 90 degrees or less, more preferably about 80 degrees or less, even more preferably about 70 degrees or less).

In accordance with this embodiment of the invention, the non-silicone hydrogel material can further comprise repeating units of a hydrophobic vinylic monomer, a vinylic crosslinking agent, a polymerizable internal wetting agent, a UV-absorbing vinylic monomer, or combinations thereof. It can also comprise a non-polymerizable international wetting agent.

All the various embodiments including preferred embodiments, which are described above, of a hydrophilic vinylic monomer, a hydrophobic vinylic monomer, a vinylic crosslinking agent, a polymerizable internal wetting agent, a UV-absorbing vinylic monomer, and a non-polymerizable international wetting agent can be used in this embodiment of this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A soft contact lens, comprising a lens body of a silicone hydrogel material and a coating of a non-silicone hydrogel thereon, wherein the silicone hydrogel material comprises first repeating units of at least one hydrophilic vinylic monomer and second repeating units of (a) at least one silicone-containing vinylic monomer, (b) a silicone-containing vinylic macromer, or (c) a combination thereof, wherein the coating has a thickness of at least 20 nm, wherein the soft contact lens has a surface mesh size of either (1) from about 4. nm to 10.6 nm or (2) at least 11 nm.

2. The soft contact lens according to invention 1, wherein the coating has a thickness of at least about 100 nm, preferably from about 0.1 μm to about 20 μm, more preferably from about 0.25 μm to about 15 μm, even more preferably from about 0.5 μm to about 10 μm.

3. The soft contact lens according to invention 1 or 2, wherein the soft contact lens has a surface mesh size of at least 11 nm.

4. The soft contact lens according to invention 1 or 2, wherein the soft contact lens has a surface mesh size of from 4.5 nm to 10.6 nm (preferably from 4.7 nm to 10.6 nm, more preferably from about 5.0 nm to 10.6 nm, even more preferably from about 6.0 nm to 10.6 nm).

5. The soft contact lens according to any one of inventions 1 to 4, wherein the soft contact lens has an elastic modulus of from about 0.1 MPa to about 1.8 MPa and a water content of from about 10% to about 80% by weight when fully hydrated, 6. The soft contact lens according to invention 5, wherein the soft contact lens has an elastic modulus of from 0.2 MPa to about 1.2 MPa, preferably from 0.3 MPa to about 1.0 MPa, more preferably from 0.4 MPa to about 0.8 MPa.

7. The soft contact lens according to any one of inventions 1 to 6, wherein the soft contact lens has a water-break-up time of at least about 10 seconds, preferably at least about 15 seconds, more preferably at least about 20 seconds, even more preferably at least about 25 seconds.

8. The soft contact lens according to any one of inventions 1 to 7, wherein the soft contact lens has a water contact angle of about 100 degrees or less, preferably about 90 degrees or less, more preferably about 80 degrees or less, even more preferably about 70 degrees or less.

9. The soft contact lens according to any one of inventions 1 to 7, wherein non-silicone hydrogel comprises: (1) repeating units of at least one vinylic monomer selected from the group consisting of (meth)acrylamide, N,N-dimethyl (meth) acrylamide, 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a weight average molecular weight of up to 1500, (meth)acrylic acid, vinyl alcohol, (meth)acryloyloxyethyl phosphorylcholine, and mixtures thereof; (2) repeating units of at least one vinylic crosslinking agent selected from the group consisting of di-(meth)acrylate-terminated polyethylene glycol, di-(meth)acrylate-terminated polyoxyethylene-polyoxypropylene block copolymer, tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and mixture thereof; (3) polymer chain segments selected from the group consisting of polyoxyethylene segments, polyamidoamine segments, polyoxazoline segments, and mixtures thereof; or (4) combinations thereof.

10. A soft contact lens, comprising a lens body of a silicone hydrogel material, wherein the silicone hydrogel material comprises first repeating units of at least one hydrophilic vinylic monomer and second repeating units of (a) at least one silicone-containing vinylic monomer, (b) a silicone-containing vinylic macromer, or (c) a combination thereof, wherein the lens body comprises an internal wetting agent for improving the hydrophilicity and wettability of the lens body, wherein the lens body: has a surface mesh size of at least 4.5 nm; an elastic modulus of from about 0.1 MPa to about 1.8 MPa; a water content of from about 10% to about 80% by weight when fully hydrated; a water-break-up time of at least about 10 seconds; and a water contact angle of about 100 degrees or less.

11. The soft contact lens according to invention 10, wherein the lens body has a surface mesh size of at least 4.7 nm, preferably at least about 5.0 nm, more preferably at least about 6.0 nm, even more preferably at least about 8 nm).

12. The soft contact lens according to invention 10 or 11, wherein the lens body has an elastic modulus of from 0.2 MPa to about 1.2 MPa, preferably from 0.3 MPa to about 1.0 MPa, more preferably from 0.4 MPa to about 0.8 MPa.

13. The soft contact lens according to any one of inventions 10 to 12, wherein the lens body has a water-break-up time of at least about 15 seconds, preferably at least about 20 seconds, more preferably at least about 25 seconds).

14. The soft contact lens according to any one of inventions 10 to 13, wherein the lens body has a water contact angle of about 90 degrees or less, preferably about 80 degrees or less, more preferably about 70 degrees or less.

15. The soft contact lens according to any one of inventions 1 to 14, wherein the silicone hydrogel material comprises the second repeating units of the silicone-containing vinylic monomer which is a vinylic monomer having a tris(trialkylsilyloxy)silylalkyl group, a vinylic monomer having a bis (trialkylsilyloxy)alkylsilylalkyl group, or a vinylic monomer having a polysiloxane segment of

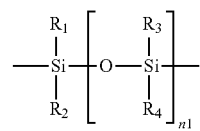

in which n1 is an integer of from 2 to 100, $R_1$, $R_2$, $R_3$, and $R_4$ independently of one another are a $C_1$-$C_{10}$ alkyl or $C_6$-$C_{18}$ aryl radical.

16. The soft contact lens according to invention 15, wherein the silicone-containing vinylic monomer is selected from the group consisting of N-[tris(trimethylsiloxy)silylpropyl] (meth)acrylamide, N-[tris(dimethylpropylsiloxy)silylpropyl] (meth)acrylamide, N-[tris(dimethylphenylsiloxy)silylpropyl] (meth)acrylamide, N-[tris(dimethylethylsiloxy) silyl-propyl] (meth)acrylamide, N-[methylbis (trimethylsiloxy)silyl]propyl (meth)acrylamide, N-methyl-N-[methyl-bis(trimethylsiloxy)silyl]propyl (meth) acrylamide N-(2-hydroxy-3-(3-(bis(trimethylsilyloxy)-methylsilyl)propyloxy)propyl)-2-methyl acrylamide; N-(2-hydroxy-3-(3-(bis(trimethylsilyloxy)-methylsilyl) propyloxy)propyl) acrylamide; N,N-bis[2-hydroxy-3-(3-(bis(trimethylsilyloxy)-methylsilyl)propyloxy)propyl]-2-methyl acrylamide; N,N-bis[2-hydroxy-3-(3-(bis (trimethylsilyloxy)-methylsilyl)propyloxy)propyl] acrylamide; N-(2-hydroxy-3-(3-(tris(trimethylsilyloxy)silyl)-propyloxy)propyl)-2-methyl acrylamide; N-(2-hydroxy-3-(3-(tris(trimethylsilyloxy)silyl)propyloxy)-propyl) acrylamide; N,N-bis[2-hydroxy-3-(3-(tris (trimethylsilyloxy)silyl)propyloxy)propyl]-2-methyl acrylamide; N,N-bis[2-hydroxy-3-(3-(tris(trimethylsiloxy)silyl)propyloxy)propyl]acrylamide; N-[2-hydroxy-3-(3-(t-butyl-dimethylsilyl)propyloxy)propyl]-2-methyl acrylamide; N-[2-hydroxy-3-(3-(t-butyldimethylsilyl)-propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy) propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis (trimethylsiloxy)-methylsilane), (3-methacryloxy-2-hydroxypropyloxy)propyltris(trimethylsiloxy)silane, 3-methacryloxy-2-(2-hydroxyethoxy)-propyloxy)propylbis (trimethylsiloxy)methylsilane, N-2-methacryloxyethyl-O-(methyl-bis-trimethylsiloxy-3-propyl)silyl carbamate, 3-(trimethylsilyl)-propylvinyl carbonate, 3-(vinyloxycarbonylthio)propyl-tris(trimethyl-siloxy)silane, 3-[tris(trimethyl-siloxy)silyl]propylvinyl carbamate, 3-[tris(trimethylsiloxy)silyl] propyl allyl carbamate, 3-[tris(trimethylsiloxy) silyl]propyl vinyl carbonate, t-butyldimethyl-siloxyethyl vinyl carbonate; trimethylsilylethyl vinyl carbonate, and trimethylsilylmethyl vinyl carbonate; mono-(meth)acryloyl-terminated, mono-$C_1$-$C_4$ alkyl-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); mono-vinylcarbonate-terminated, mono-$C_1$-$C_4$ alkyl-terminated polydimethylsiloxanes; mono-vinylcarbamate-terminated, mono-$C_1$-$C_4$ alkyl-terminated polydimethylsiloxane; mono-methacrylamide-terminated, mono-$C_1$-$C_4$ alkyl-terminated polydimethylsiloxanes; mono-acrylamide-terminated, mono-$C_1$-$C_4$ alkyl-terminated polydimethylsiloxanes; combinations thereof.

17. The soft contact lens according to any one of inventions 1 to 16, wherein the silicone hydrogel material comprises the second repeating units of the silicone-containing vinylic macromer which is a polysiloxane vinylic macromer having a polysiloxane segment of

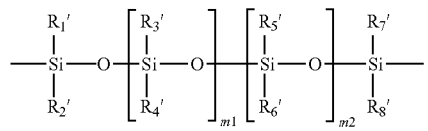

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, $C_5$-$C_{30}$ organic radical having one or more hydroxyl groups, -alk-$(OC_2H_4)_{m3}$—OR' (in which alk is $C_1$-$C_6$ alkyl diradical, R is H or $C_1$-$C_4$ alkyl and m3 is an integer from 1 to 10), or a linear hydrophilic polymer chain.

18. The soft contact lens according to invention 17, wherein the silicone-containing vinylic macromer is selected from the group consisting of di-(meth)acrylate-terminated polydimethylsiloxane, di-vinyl carbonate-terminated polydimethylsiloxanes, di-vinyl carbamate-terminated polydimethylsiloxane, di-(meth)acrylamide-terminated polydimethylsiloxane, bis-3-methacryloxy-2-hydroxypropyloxypropyl polydimethylsiloxane, N,N,N',N'-tetrakis(3-methacryloxy-2-hydroxypropyl)-alpha,omega-bis-3-aminopropyl-polydimethylsiloxane, a reaction product of glycidyl methacrylate with amino-functional polydimethylsiloxane, a reaction product of glycidyl methacrylate with a hydroxyl-functionalized siloxane-containing vinylic monomer, a reaction product of glycidyl methacrylate with a hydroxyl-functionalized siloxane-containing macromer, and combinations thereof.

18. The soft contact lens according to any one of inventions 1 to 17, wherein the silicone hydrogel material comprises at least one polymerizable internal wetting agent, at least one non-polymerizable internal wetting agent, or combinations thereof.

19. The soft contact lens according to invention 18, wherein the polymerizable internal wetting agent is a hydrophilic polymer having one sole ethylenically unsaturated group, a N-vinyl hydrophilic vinylic monomer, or combinations thereof, wherein the N-vinyl hydrophilic vinylic monomer is selected from the group consisting of N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, and 5-methyl-3-methylene-2-pyrrolidone.

20. A soft contact lens, comprising a lens body of a non-silicone hydrogel material, wherein the non-silicone hydrogel material comprises repeating units of at least one hydrophilic vinylic monomer and is free of silicone-containing vinylic monomer or macromer, wherein the lens body: has a surface mesh size of at least 4.5 nm; an elastic modulus of from about 0.1 MPa to about 1.8 MPa; a water content of from about 25% to about 85% by weight when fully hydrated; a water-break-up time of at least about 10 seconds; and a water contact angle of about 100 degrees or less.

21. The soft contact lens according to invention 20, wherein the lens body has a surface mesh size of at least 4.7 nm, preferably about 5.0 nm, more preferably at least about 6.0 nm, even more preferably at least about 8 nm.

22. The soft contact lens according to invention 20 or 21, wherein the lens body has an elastic modulus of from 0.2 MPa to about 1.2 MPa, preferably from 0.3 MPa to about 1.0 MPa, more preferably from 0.4 MPa to about 0.8 MPa.

23. The soft contact lens according to any one of inventions 20 to 22, wherein the lens body has a water-break-up time of at least about 15 seconds, preferably at least about 20 seconds, more preferably at least about 25 seconds.

24. The soft contact lens according to any one of inventions 20 to 23, wherein the lens body has a water contact angle of about 90 degrees or less, preferably about 80 degrees or less, more preferably about 70 degrees or less.

25. The soft contact lens according to any one of inventions 1 to 24, wherein said at least one hydrophilic vinylic monomer is selected from the group consisting of 2-hydroxyethyl (meth)acrylate, glycerol (meth)acrylate, hydroxypropyl (meth)acrylate, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, (meth)acrylic acid, vinyl alcohol, (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl)methyl]-acrylamide, trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate, a $C_1$-$C_4$-alkoxy polyethylene glycol (meth) acrylate having a weight average molecular weight of up to 1500, and mixtures thereof.

26. The soft contact lens according to invention 25, wherein said at least one hydrophilic vinylic monomer is selected from the group consisting of 2-hydroxyethyl methacrylate, glycerol methacrylate, N-vinylpyrrolidone, N-vinyl-N-methyl acetamide, N-methyl-3-methylene-2-pyrrolidone, (meth)acrylic acid, vinyl alcohol, (meth)acrylamide, N,N-dimethyl (meth)acrylamide, N-hydroxyethyl acrylamide, N-2-aminoethyl (meth)acrylamide hydrochloride, N-3-aminopropyl (meth)acrylamide hydrochloride, aminoethyl methacrylate hydrochloride, dimethylaminoethyl methacrylate, a $C_1$-$C_4$-alkoxy polyethylene glycol (meth)acrylate having a weight average molecular weight of up to 1500, and mixtures thereof.

27. A method for producing biomedical devices according to procedure (I) or (II), wherein procedure (I) comprises the steps of: (a) obtaining preformed biomedical devices made of a first hydrogel; (b) selecting a surface treatment or a combination of two or more surface treatments, coating materials, and coating conditions under which the selected coating materials can be applied onto a preformed biomedical device according to the selected surface treatment or the selected combination the two or more surface treatments to obtain a coated biomedical device having a coating of a second hydrogel thereon, wherein the second hydrogel is a non-silicone hydrogel and has a first targeted surface mesh size of at least 4.5 nm; and (c) applying the selected coating materials onto the preformed biomedical devices under the selected coating conditions to form the biomedical devices each having a coating of the second hydrogel having the first targeted surface mesh size, wherein procedure (II) comprises the steps of: (a) selecting a mold material for making molds; (b) selecting a polymerizable formulation and curing conditions under which the selected polymerizable composition can be cured in the selected mold under the selected curing conditions to form a biomedical device of a third hydrogel, wherein the third hydrogel has a second targeted surface mesh size of at least about 4.5 nm; and (c) introducing and curing the selected polymerizable formulation in the molds to form the biomedical devices each having the second targeted mesh size.

28. The method according to invention 27, wherein the biomedical devices are hydrogel contact lenses, preferably silicone hydrogel contact lenses.

29. The method according to invention 27 or 28, wherein the first and second targeted surface mesh sizes independently of each other are at least 4.7 nm, preferably about 5.0 nm, more preferably at least about 6.0 nm, even more preferably at least about 8 nm.

30. The method according to any one of inventions 27 to 29, wherein the biomedical devices are produced according procedure (I).

31. The method according to invention 30, wherein the preformed biomedical devices are non-silicone hydrogel contact lenses.

32. The method according to invention 30, wherein the preformed biomedical devices are silicone hydrogel contact lenses.

33. The method according to any one of inventions 30 to 32, wherein the selected surface treatment of the selected combination of the two or more surface treatments comprises a plasma treatment, a graft-polymerization of one or more hydrophilic vinylic monomers and/or macromers, a layer-by-layer deposition of one or more first hydrophilic polymeric materials, covalently attachment of one or more second hydrophilic polymeric materials, or a combination thereof.

34. The method according to invention 33, wherein the plasma treatment is carried out under low pressure and is a process of plasma-induced polymerization, a plasma grafting, plasma oxidation, or combination thereof.

35. The method according to invention 33, wherein the plasma treatment is carried out at a surrounding atmospheric pressure.

36. The method according to invention 33, wherein the one or more first hydrophilic polymeric materials comprise at least one polyanionic material selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer selected from the group consisting of polyacrylic acid, polymethacrylic acid, poly(acrylic acid-co-methacrylic acid), and a mixture thereof.

37. The method according to invention 33, wherein the graft-polymerization is carried out with one or more hydrophilic vinylic monomers selected from the group consisting of (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl) methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a weight average molecular weight of up to 1500, (meth)acrylic acid, and mixtures thereof in the presence or absence of a hydrophilic vinylic crosslinking agent.

38. The method according to invention 37, wherein the graft-polymerization is carried out in the presence of a hydrophilic vinylic crosslinking agent selected from the group consisting of di-(meth)acrylate-terminated polyethylene glycol, di-(meth)acrylate-terminated polyoxyethylene-polyoxypropylene block copolymer, ethylene glycol tetra-ethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, triallyl cyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and combinations thereof.

39. The method according to any one of inventions 33 to 38, wherein the coating of the second hydrogel is covalently attached onto a reactive base coating, wherein the reactive base coating is: an LbL coating, a plasma coating, combination of a plasma coating and an LbL coating thereon; a layer of one or more hydrophilic polymers obtained by covalently attachment or graft polymerization; combination of a layer of one or more hydrophilic polymers and an LbL coating thereon; or combination of plasma coating, a layer of one more hydrophilic polymers on top of the plasma coating, and an LbL coating on top of the layer of one or more hydrophilic polymers.

40. The method according to invention 39, wherein the coating of the second hydrogel is obtained by heating a contact lens with a reactive base coating thereon in a solution comprising a water-soluble and thermally-crosslinkable hydrophilic polymeric material at a temperature of from about 60° C. to about 140° C. for a time period sufficient long to crosslink the water-soluble thermally-crosslinkable hydrophilic polymeric material and the base coating so as to form the coating of the second hydrogel on the contact lens.

41. The method according to invention 40, wherein the water-soluble and thermally-crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

42. The method according to any one of inventions 33 to 41, wherein the preformed contact lenses have a second target surface mesh size before being subjected to any surface treatment, provided that the first targeted surface mesh size is larger than the second targeted surface mesh size.

43. The method according to any one of inventions 27 to 29, wherein the biomedical devices are contact lenses and are produced according procedure (II).

44. The method according to invention 43, wherein the polymerizable formulation comprises at least one N-vinyl type vinylic monomer.

45. The method according to invention 44, wherein the N-vinyl type vinylic monomer is N-vinylpyrrolidone, N-vinyl acetamide, N-vinyl-N-methyl acetamide, or combinations thereof.

46. The method according to any one of inventions 43 to 45, wherein the polymerizable formulation comprises at least one non-crosslinkable hydrophilic polymer having a weight-average molecular weight $M_w$ of from 5,000 to 1,000,000 Daltons.

47. The method according to any one of inventions 43 to 46, wherein the polymerizable formulation comprises at least one hydrophilic polymer having one sole ethylenically unsaturated group.

48. A method of manufacturing biomedical devices, comprising the step of: inspecting manufactured biomedical devices for having a targeted lubricity as measured by having a surface mesh size of at least 4.5 nm (preferably at least 4.7 nm, more preferably about 5.0 nm, even more preferably at least about 6.0 nm, most preferably at least about 8 nm); and discarding those contact lenses which do not have the targeted lubricity.

49. The method according to invention 48, wherein the biomedical devices are contact lenses.

50. The method according to invention 48 or 49, wherein the inspecting step is conducted by statistical sampling or conducted continuously on production line.

All patents, patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

Example 1

Hydrogel Preparation

Gemini hydrogel interfaces were created by sliding hydrogel probes against flat hydrogel disks. Hydrogel probes were made by polymerizing PAAm in a diamond-turned polyolefin mold to produce probe geometry with about 2 mm radius of curvature. Hydrogel disks were cast in polystyrene Petri dishes to produce sheet geometry with about 60 mm diameter and greater than 2 mm thickness. Hydrogel samples were prepared by synthesizing five different compositions of polyacrylamide (PAAm) hydrogels as shown in Table 1, below. Acrylamide monomer (AAm) was crosslinked with N,N'-methylene-bis-acrylamide (MBAm) and catalyzed by a tetramethylethylenediamide (TEMED) reductant and ammonium persulfate (APS) oxidant in a solvent of ultrapure water (18.2 MΩ). Aliquots (10-250 g) of each constituent in solution were prepared with a measurement resolution of 1 mg. The ratio of monomer to crosslinking agent was held constant to minimize differences in probe radii of curvature due to swelling. After polymerization, samples were allowed to equilibrate in ultrapure water for ~40 hours prior to experimentation.

TABLE 1

Hydrogel sample formulations reported as mass-per-mass of solvent.

| Sample No. | AAm | MBAm | TEMED | APS |
|---|---|---|---|---|
| 1 | 3.75 | 0.15 | 0.15 | 0.15 |
| 2 | 7.50 | 0.30 | 0.15 | 0.15 |
| 3 | 10.00 | 0.40 | 0.15 | 0.15 |
| 4 | 12.50 | 0.50 | 0.15 | 0.15 |
| 5 | 17.50 | 0.70 | 0.15 | 0.15 |

Characterization

The mechanical properties of soft, permeable, optically transparent hydrogels are challenging to determine even with in situ characterization. Indentation measurements were performed to determine the elastic modulus of the PAAm hydrogel against acrylic using the methods and apparatus described in Krick et al., *Tribol. Lett.* 2011, 45, 185-94. We revealed the area of contact by implementing particle exclusion microscopy (PEM), wherein the acrylic counter-surface was flooded with a solution of monochromatic particles prior to loading a hydrogel probe against the acrylic. The apparent area of contact was determined by observing where particles were excluded from the hydrogel-acrylic interface. A contact diameter of about 1 mm was observed by PEM between the PAAm probe and acrylic sheet under a 2 mN normal force. Using this analysis, the Gemini hydrogel interface was determined to have a contact pressure of ~3 kPa. Effective contact modulus for each of the five hydrogel samples was calculated for Gemini interfaces from force-displacement curves using the Johnson-Kendall-Roberts (JKR) theory as described in Pitenis et al. *Soft Matter* 2014, 10, 8955-8962. The moduli ranged between 1.5-120 kPa, Swelling The swelling behavior of PAAm gels in ultrapure water was studied at approximately 20° C. Hydrogel samples were cast in a polytetrafluoroethylene (PTFE) tube. After polymerization, each cylindrical sample was extracted and cut in 10-20 mm long sections that were individually placed in ultrapure water in 6 mL glass vials. The sample dimensions were recorded prior to and after about 40 hours of swelling. Volume increase was calculated from the difference between the final and initial dimensions, assuming three-dimensional isotropic swelling.

Small Angle X-ray Scattering (SAXS)

Figure 3:
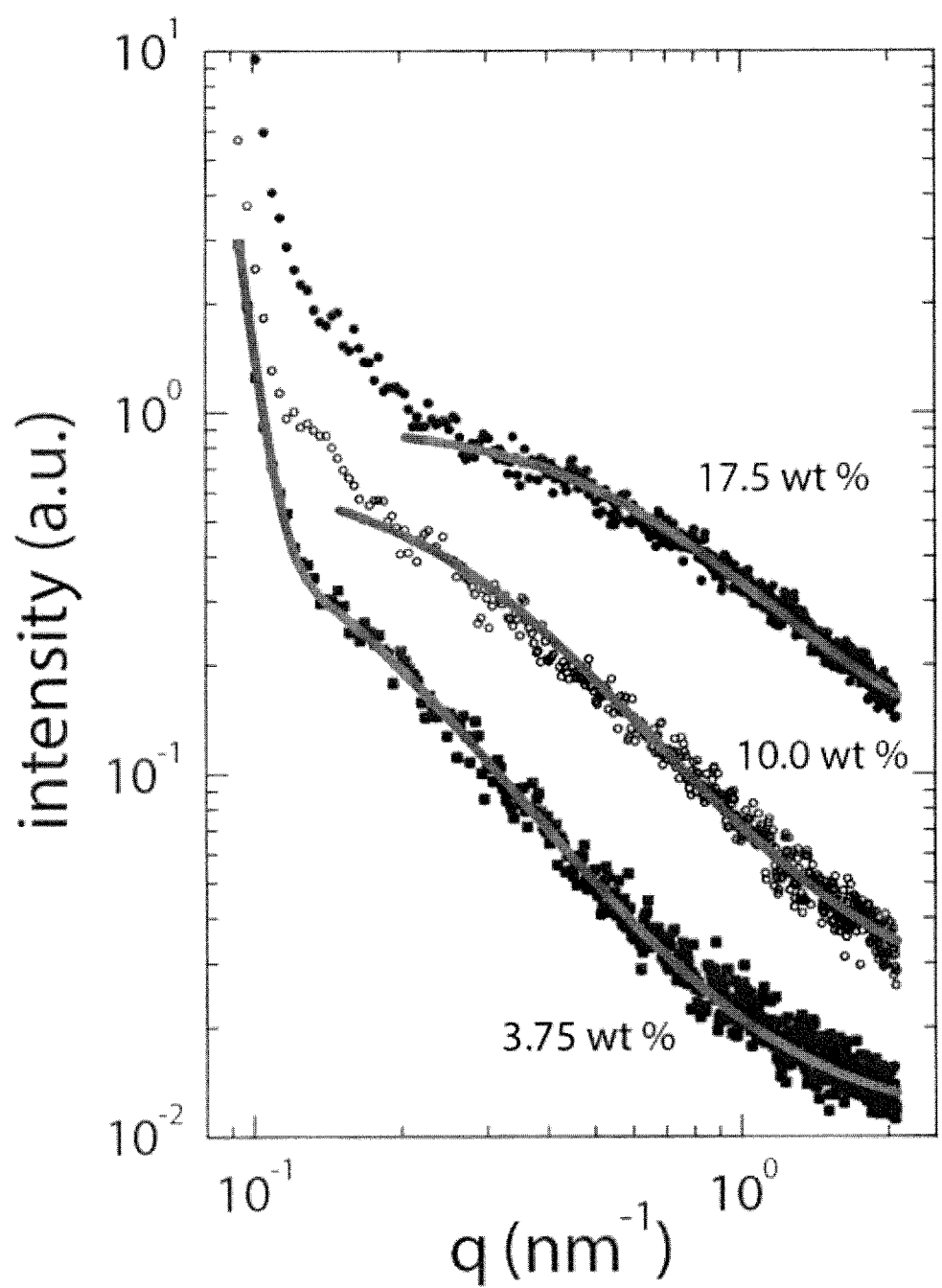
FIG. 3 shows portions of small angle x-ray scattering spectra where a broadening shoulder is observed at high q with increasing polymer concentration and where a Lorentzian line shape is fit to measure the width, $\Gamma$, of each spectrum; $\xi$ is inversely proportional to $\Gamma$, showing decreasing $\xi$ with increasing polymer concentration.

Small Angle X-ray Scattering (SAXS) allowed the characterization of the nanoscale structure in the PAAm samples and determine mesh size. Samples were prepared by pipetting the acrylamide mixture, before polymerization, into amorphous quartz capillary tubes of 1.5 mm diameter and 10 µm wall thickness. To enhance Z-contrast between the polymer and solvent, the cured hydrogels were equilibrated against an equal volume of aqueous 100 mM CsCl. The capillaries were flame-sealed and the gels equilibrated overnight before performing SAXS measurements. SAXS data was collected for 10 hours per sample on a 2D wire detector with 1024×1024 pixels. The 2D S(q) scattering spectra were integrated along the azimuthal direction to produce 1D curves for the entire range of compositions, from 3.75 to 17.5% PAAm, as shown in FIG. 3. By varying composition and fitting the spectra with Lorentzian lineshapes of the form $S(q)=1/(q^2+\Gamma^2)$, we determined the mesh size from $\xi=1/\Gamma$. With increasing polymer content a broadening shoulder corresponding to an increase in the Lorentzian width, $\tau$, and a reduction in mesh size is observed. The error is the 95% confidence intervals from non-linear least-squares fitting of the data. The experimental uncertainty from counting statistics is expected to be approximately the same as the noise seen in the data, approximately 15%, which marginally increases uncertainty of the fitted peak widths.

The mesh sizes of five samples are determined according to the SAXS method described above and reported in Table 2.

TABLE 2

Experimental mesh sizes by SAXS.

| | Sample No. | | | | |
|---|---|---|---|---|---|
| | 1 | 2 | 3 | 4 | 5 |
| Mesh Size ($\xi$) (nm) | 9.4 ± 1.1 | 7.0 ± 0.5 | 4.4 ± 0.3 | 1.7 ± 0.1 | 1.3 ± 0.1 |

Experimental Apparatus

Friction measurements were performed on a high-speed, unidirectional, pin-on-disk microtribometer illustrated in FIG. 4A and described in Pitenis et al. The PAAm hydrogel probe was molded onto a 4-40 stainless steel set screw and fastened onto a titanium double flexure cantilever assembly with a normal stiffness of 161 µN/µm and a lateral stiffness of 75 µN/m. The PAAm hydrogel disk was fixed to a piezoelectric rotary stage capable of angular speeds up to 720 degrees/second (Physik Instrumente M-660.55, 4 µrad positional resolution). The stroke radius was 10 mm for sliding speeds of 1-100 mm s$^{-1}$ and 1.7 mm for 0.03-0.1 mm s$^{-1}$. The error in friction measurements associated with performing unidirectional pin-on-disk experiments is 0.05% for the 10 mm stroke radius and 30% for the 1.7 mm radius following the analysis in Krick et al., *Tribol. Lett.* 2010, 39, 221-2. The hydrogel probe was brought into contact with the hydrogel disk to a normal force of 2 mN by a vertical coarse positioning micrometer stage. The hydrogel probe and hydrogel disk were fully submerged in a bath of ultrapure water during friction experiments. The normal ($F_n$) and friction ($F_f$) forces on the probe, shown in FIG. 4B and FIG. 4C, were measured with 3 mm capacitive displacement sensors (5 µm/V sensitivity and 20 V range) mounted axially and tangentially to the probe, respectively. The friction coefficient, µ, was computed as the ratio of the measured friction force to the normal force.

The results of friction measurements of five polyacrylamide hydrogels having different mesh sizes are shown in FIG. 2A.

Example 2

Classical Particle Tracking is a micro-rheological technique that allows simultaneous tracking of several micrometer or nanometer-sized particles using video microscopy. For example, images of particles undergoing thermally driven motion are recorded at about 30 frames per second and at an exposure of 30 ms for one thousand frames. These frames are analyzed using an image processing MATLAB code which produces the trajectories of individual particles. The particle trajectories are used to calculate the mean square displacement (MSD) (designated as $\Delta r^2$), given by $$\Delta r^2(\tau) = \langle (r(t+\tau)-r)^2 \rangle, \quad (1)$$

where the thermodynamic average over many starting times, t, and over many particles for an ensemble is indicated by angle brackets. The theory of microrheology relates the viscous and elastic moduli to the MSD. In the linear, frequency-independent regime of an elastic hydrogel, the relationship between the elastic modulus and MSD simplifies to $$G' \cong \frac{k_B T}{\Delta r^2 \pi a}, \quad (2)$$

where $k_B$ is Boltzmann's constant, T is temperature, and a is particle radius. In this linear regime, the elastic modulus is also approximately given by $k_B T/\xi^3$, where $\xi$ is the mesh-size.

Thus, the mesh size can be directly related to the MSD of each particle:

$$\xi = (\Delta r^2 \pi a)^{1/3}. \quad (3)$$

Unfortunately, this microrheological technique suffers a major drawback. The particle diameter (on the order of micrometers) must be much larger than the mesh size (nanometers) of the hydrogel for this theoretical relationship to work, and large particles move very small distances in elastic hydrogels. This is problematic because the characteristic modulus at the surface of contact lenses is generally larger than 10 kPa limiting the motion of embedded microspheres to displacements on the order of nanometers, making $\Delta r^2$ too small to detect using traditional particle tracking. To overcome the challenges associated with detecting smaller displacements in the mesh of contact lenses, a new method has been developed which features a 4-quadrant method to improve sensitivity.

Figure 5:
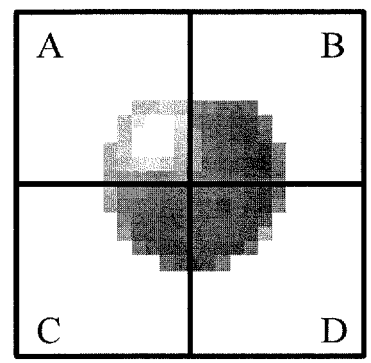
FIG. 5 illustrate how to use the 4-quadrant method to improve sensitivity in particle tracking.

The 4-quadrant method (FIG. 5) consists of first calculating the equilibrium position of each tracked particle over time by performing a running average every fifty frames. The motion of each particle is captured with this method by continuously computing the distance the particle moves from the equilibrium position in the x and y directions, given by $\Delta x$ and $\Delta y$, by comparing the integrated intensity measured within each of the four quadrants.

$$\Delta x = \frac{A+C-B-D}{A+C+B+D},$$

$$\Delta y = \frac{A+B-C-D}{A+C+B+D}$$

To evaluate the sensitivity of this 4-quadrant method, a simulation (FIG. 6) is performed where a particle is artificially moved by a random but known displacement within a range, d, and random noise with known amplitude. The resulting sensitivity shows that the 4-quadrant method can be used for contact lenses.

The experimental procedure for impregnating contact lenses with particles is described as follows. All lenses are removed from their packages and immediately swollen in a 0.04% solution of fluorescent nanoparticles, FluoSpheres® from ThermoFisher (Catalog No. F8793, having a diameter of 0.045±0.0075 μm), in isopropanol for 12 hours. The lenses are placed in a solution of Unisol with a 0.04% solution of the nanoparticles for 12 hours to equilibrate and return to their original mesh size with the particles trapped inside the contact lens.

Figure 7:
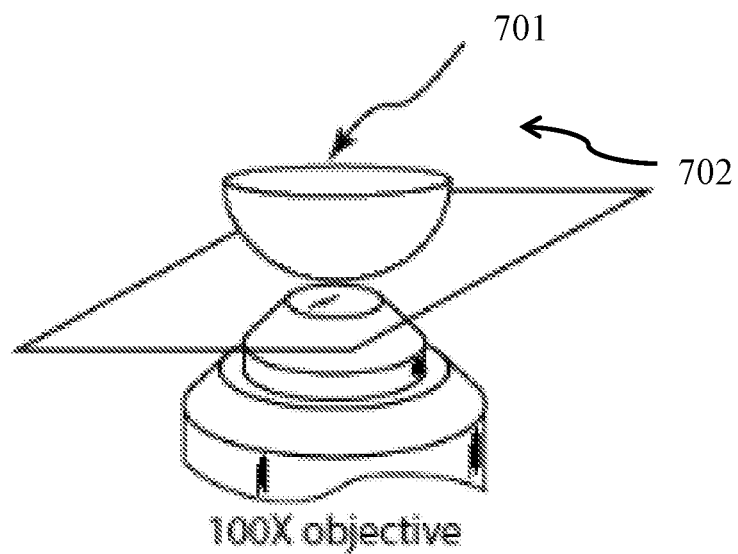
FIG. 7 illustrates schematically the setup of microscope for inspection of a particle filled lens.

The particle-filled contact lens (701) is placed on a glass coverslip (702) of thickness 170 μm (FIG. 7). Two drops of Unisol are placed in the concave-up reservoir of the contact lens to ensure a conformal imaging surface. The microscope used is a Nikon Eclipse Ti and an Andor iXon Ultra EMCCD camera using a 100× super resolution objective SR APO TIHF with a numerical apeture of 1.49. The software used is a custom Nikon NIS Elements version 4.00.12. Epifluorescence imaging technique is used in the particle tracking. The working distance of the objective is 120 microns. Nanoparticles located within the surface region from 0 to about 400 nm from the lens surface are imaged and tracked.

Figure 6:
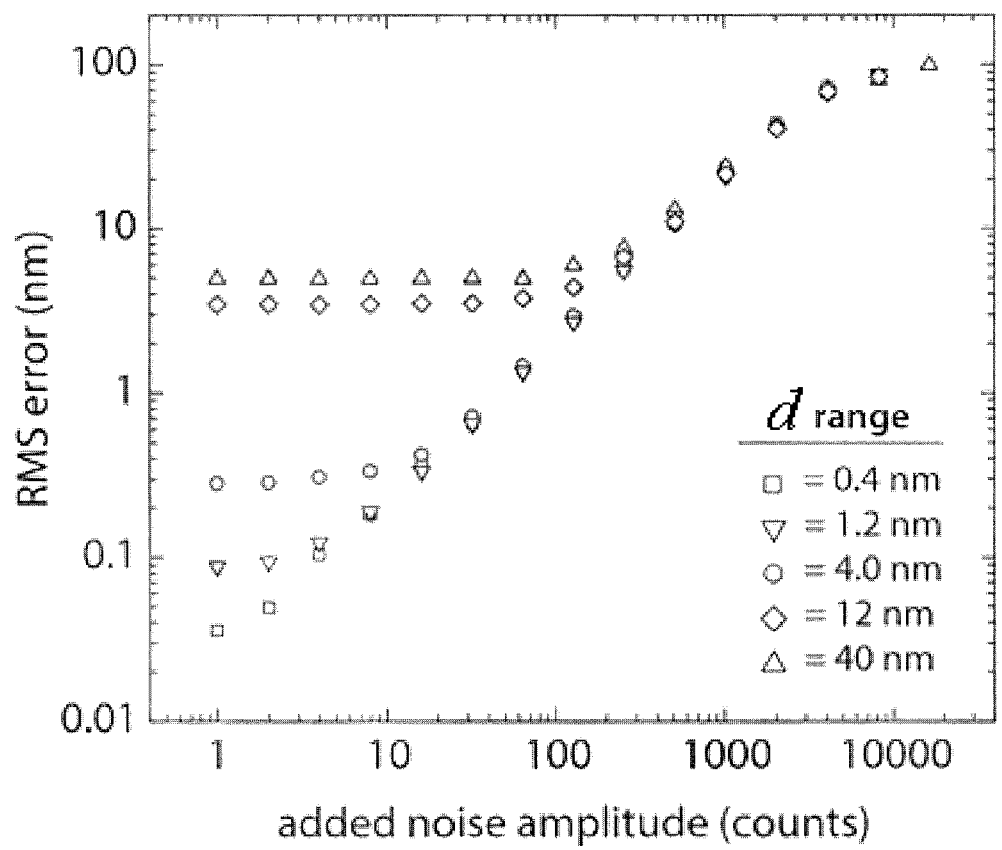
FIG. 6 shows a plot of the RMS (Root Mean Square) error of the particle tracking simulation as a function of added noise amplitude for multiple ranges in known artificial displacement, d.

For each of the measurements the experimental noise amplitude is measured and compared to FIG. 6 to determine the RMS error in $\Delta r$ for each sample. The RMS error is used to calculate the apparent mesh size ($\Xi$), within the surface region, which is given by:

$$\Xi = [\pi a (\Delta r^2 - 2(RMS_{error})^2)]^{1/3} \quad (4)$$

To calibrate the apparent mesh size measurements here with the mesh size measurements by SAXS in Example 1, five different pAAm samples are prepared according to the procedure described in Example 1 and with the inclusion of fluorescent nanoparticles, FluoSpheres® from ThermoFisher (Catalog No. F8801, having a diameter of 0.11±0.0070 μm) at a concentration of 7.3 wt % of total solution. The apparent mesh size and the actual mesh size (determined in Example 1) for the five pAAm samples are reported in Table 3.

TABLE 3

Apparent mesh size by particle tracking vs actual mesh size by SAXS.

| Sample No | mesh size, ξ (nm) | std dev. | apparent mesh size, Ξ (nm) | std dev. |
|---|---|---|---|---|
| 1 | 9.4 | 1.1 | 18.5 | 0.29 |
| 2 | 7 | 0.5 | 14.4 | 0.52 |
| 3 | 4 | 0.3 | 8.1 | 1.67 |
| 4 | 1.7 | 0.1 | 5.9 | 2.64 |
| 5 | 1.3 | 0.1 | 7.2 | 1.50 |

Figure 8:
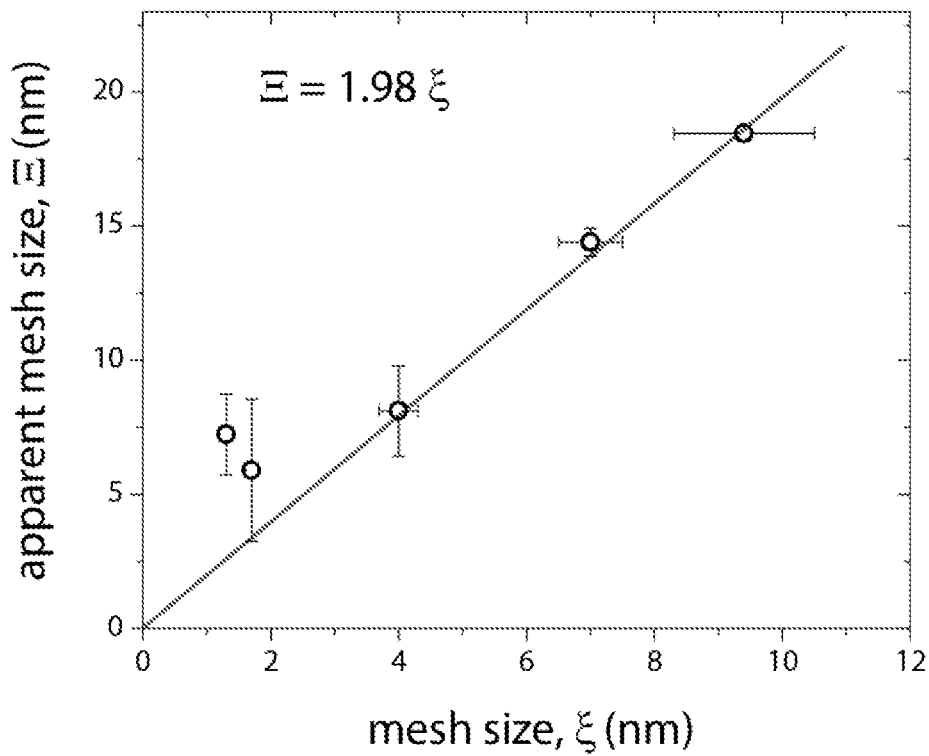
FIG. 8 shows a calibration curve and a plot of apparent mesh size vs actual mesh size for five different pAAm hydrogels.

A correlation between the apparent and actual mesh size is obtained by fitting the date shown in FIG. 8 and is found to be $$\Xi = 1.98\xi. \quad (5)$$

The mesh size of contact lenses with trapped fluorescent beads within the surface region (i.e., surface mesh size) is determined by calculating the noise amplitude of each lens sample, estimating the RMS error in $\Delta r$ from FIG. 6, and then employing equation (4). The apparent mesh size ($\Xi$) is used to calculated the surface mesh size ($\xi$) using the calibration curve in FIG. 8.

Example 3

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Preparation of Lens Formulations

A lens formulation is prepared by dissolving components in 1-propanol to have the following composition: CE-PDMS macromer prepared above (about 32 parts); N-[tris(trimethylsiloxy)-silylpropyl]acrylamide (about 21 parts); N,N-dimethylacrylamide (about 23); N-(carbonyl-methoxypolyethylene glycol-2000)-1,2-disteaoyl-sn-glycero-3-phosphoethanolamin, sodium salt) (about 0.6 parts); Darocur 1173 (about 1 parts); visitint (5% copper phthalocyanine blue pigment dispersion in tris(trimethylsiloxy)silylpropylmethacrylate, TRIS) (about 0.1 parts); 1,2-dimyristoyl-sn-glycero-3-phosphocholine (about 0.8 parts); 1-hydroxy-2,2,6,6-tetramethyl-piperidine (about 200 ppm); and 1-propanol (about 22 parts).

Preparation of Uncoated Contact Lenses

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds. Cast-molded contact lenses are then extracted by dipping in the following series of baths: DI (deionized) water bath (about 56 seconds); 6 MEK baths (about 44, 56, 56, 56, 56, and 56 second respectively); and one DI water bath (about 56 seconds).

Example 4

Synthesis of Glycerol Ether Containing Polydimethylsiloxane Macromer (X22-1661A)

mL of additional CHCl$_3$, and the solution is then stirred overnight. After filtration, the solvent is removed via Rotovap, followed by high vacuum. 102 g of final product (the precursor) is obtained.

A small reactor is connected to a heater and air condenser with drying tube. 21 g of toluene, 15 g of above precursor, and 5.03 g of 3-allyloxy-1,2-propanediol are added to the reactor. After the solution temperature is stabilized at 30° C., 152 µL of Karstedt's catalyst (2 Pt % in xylene) is added. After 2 h, the conversion of Si—H of 100% based on IR is achieved. The solution is then transferred to a flask, concentrated using Rotovop, followed by precipitation in actenotrile/water mixture (75/25) three times. After removal of solvent via Rotovop, followed by high vacuum, 12 g of hazy liquid is obtained.

Preparation of Polymerizable Compositions

A lens formulation (polymerizable composition) is prepared by mixing all the specified polymerizable components to have the following composition: MCR-M07 (34 parts); X22-1661A (6 parts); NVP (40 parts); MMA (10 parts); EGMA (10 parts); TEGDMA (0.4 part); AMA (0.1 part); Norbloc (1.8 parts); Vazo 64 (0.5 part); RB 247 (0.01 part); and t-amyl alcohol (1 part). After all the solid is dissolved, a filtration of the formulation is carried out by using 2.7 um GMF filter.

MCR-M07 represents monobutyl-terminated monomethacryloxypropyl-terminated polydimethylsiloxane (M.W. 600 to 800 g/mol from Gelest); NVP represents N-vinylpyrrolidone; MMA represents methyl methacrylate; TEGDMA represent triethyleneglycol dimethacrylate; EGDMA represents ethylene glycol methyl ether methacrylate; AMA represents allyl methacrylate; VAZO 64 represents 2,2'-dimethyl-2,2'azodipropiononitrile; Norbloc is 2-[3-(2H-Benzotriazol-2-yl)-4-hydroxyphenyl]ethyl methacrylate from Aldrich; and RB247 is Reactive Blue 247 from Arran.

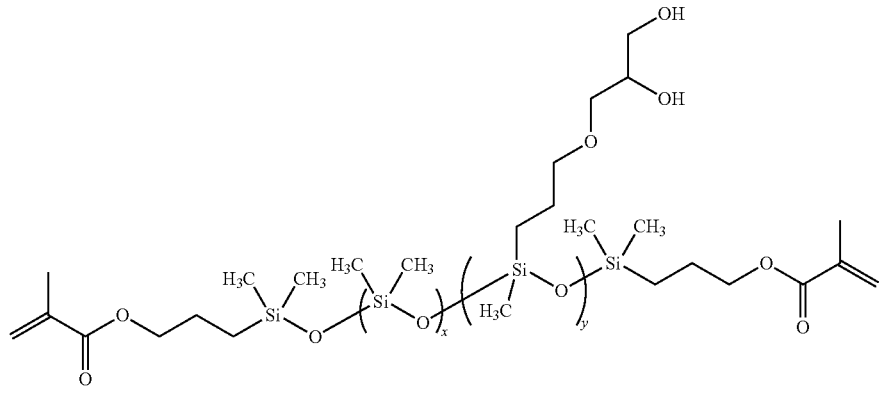

x = 93; y = 5

275.9 g of octamethylcyclotetrasiloxane (M.W. 296.62), 12.0 g of 1,3,5,7-tetramethylcyclotetrasiloxane (M.W. 240.51), 9.7 g of 1,3-bis(3-methacryloxypropyl) tetramethyldisiloxane (M.W. 386.63), and 0.9 g of trifluoromethanesulfonic acid (M.W. 150.08) are weighed into a 500 mL round bottom flask. After the reaction is run at 35° C. for 24 h, 170 mL of 0.5% sodium hydrogen carbonate is added. The collected organic portion is further extracted five times with de-ionized water (170 mL per cycle). Anhydrous MgSO$_4$ is added to the collected organic solution, followed by ~350

Preparation of Silicone Hydrogel Contact Lenses

A lens formulation is purged with nitrogen at room temperature for 30 to 35 minutes. The N$_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded lenses are removed from the molds.

Example 5

PAA-Coating Solution.

A PAA coating solution is prepared by dissolving an amount of PAA (M.W.: 450 kDa, from Lubrizol) in a given volume of 1-propanol to have a concentration of about 0.40-0.44% by weight and the pH is adjusted with formic acid to about 2.

Phosphate Buffered Saline (PBS).

A phosphate buffered saline is prepared by dissolving $NaH_2PO_4.H_2O$, $Na_2HPO_4.2H_2O$, and in a given volume of purified water (distilled or deionized) to have the following composition: about 0.04 w/w % $NaH_2PO_4.H_2O$, about 0.39 w/w/% $Na_2HPO_4.2H_2O$, and about 0.79 w/w % NaCl.

IPC Salines

Four in-package-crosslinking (IPC) salines are prepared from polyamidoamine-epichlorohydrin (PAE) and a copolymer of acrylamide (AAm) and acrylic acid in a molar ratio of 10:1 (i.e., PAAm-PAA (90/10)), for forming hydrogel coatings with different crosslinking densities on silicone hydrogel contact lenses. PAAm-PAA (90/10) partial sodium salt (~90% solid content, PAAm-PAA 90/10, Mw 200,000) is purchased from Polysciences, Inc. and used as received. PAE (Kymene, an azetidinium content of about 0.56 assayed with NMR) is purchased from Ashland as an aqueous solution and used as received.

IPC salines are prepared as follows. About 0.07% by weight of PAAm-PAA 90/10, about 0.088% by weight of PAE, about 0.04 w/w % of $NaH_2PO_4.H_2O$, about 0.39 w/w/% of $Na_2HPO_4.2H_2O$, and about 0.79 w/w % NaCl are dissolved in purified water (deionized or distilled water) and the pH of the resultant solution is adjusted to 7.4±0.1. As specified in Table 4, then the solution either is not heat-pretreated or is heat pre-treated for about 6 hours at about 60° C. (heat pretreatment). During this heat pretreatment, PAAm-PAA and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, a specified amount of PAE is added in the heat-pre-treated solution to form a desired IPC saline. The prepared saline is filtered using a 0.22 micron polyether sulphone [PES] membrane filter and cooled down back to room temperature. About 5 ppm hydrogen peroxide is then added to the final IPC saline to prevent bioburden growth and the IPC saline is filtered using a 0.22 micron PES membrane filter. The prepared IPC saline is stored at 4° C. in a refrigerator until needed.

TABLE 4

The IPC saline composition and preparation conditions.

| IPC Saline | Pre-reaction composition | | Pre-reaction Temp/time | After pre-reaction [PAE] added |
|---|---|---|---|---|
| | [PAAm-PAA] | [PAE] | | |
| 94-1 | 0.07% | 0.088% | no pre-reaction | 0 |
| 94-2 | 0.07% | 0.088% | 60° C./6 hr | 0.176% |
| 94-3 | 0.07% | 0.088% | 60° C./6 hr | 0.088% |
| 94-4 | 0.07% | 0.088% | 60° C./6 hr | 0 |

Concentration: % by weight.

Lenses with PAA Base Coating.

Cast-molded silicone hydrogel contact lenses prepared in Example 3 were dip coated in 0.44% PAA 1-PrOH solution (pH~2) for 44 sec, then rinsed in 50/50 1-ProH/water mixture, followed by rinsing in water.

Lenses with Crosslinked Hydrophilic Coating.

Lenses having a PAA base coating thereon prepared above are placed in polypropylene lens packaging shells (one lens per shell) with 0.6 mL of PBS or one of the IPC salines (half of the saline is added prior to inserting the lens). The blisters are then sealed with foil and autoclaved for about 30 minutes at about 121° C., forming SiHy contact lenses with crosslinked coatings thereon in the presence of an IPC saline (no crosslinked hydrophilic coating is formed when the packaging saline is PBS). The coated Silicone hydrogel contact lenses are named after the name of the saline used in forming the top hydrogel coating.

Example 6

PAA-Coating Solution.

A PAA coating solution is prepared by dissolving an amount of PAA (M.W.: 450 kDa, from Lubrizol) in a given volume of deionized water to have a concentration of about 0.1% by weight and the pH is adjusted with formic acid to about 2.

Phosphate Buffered Saline (PBS).

The PBS prepared in Example 5 is used.

IPC Salines

Five in-package-crosslinking (IPC) salines are prepared from PAE and PAAm-PAA 90/10, for forming hydrogel coatings with different crosslinking densities on silicone hydrogel contact lenses.

IPC salines are prepared as follows. An amount (specified in Table 5) of PAAm-PAA 90/10, an amount (specified in Table 5) of PAE, about 0.04 w/w % of $NaH_2PO_4.H_2O$, about 0.39 w/w/% of $Na_2HPO_4.2H_2O$, and about 0.79 w/w % NaCl are dissolved in purified water (deionized or distilled water) and the pH of the resultant solution is adjusted to 7.4±0.1. Then the solution is heat pre-treated for a period of time (specified in Table 5) at a temperature specified in Table 5 (heat pretreatment). During this heat pretreatment, PAAm-PAA and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pretreatment, the prepared saline is filtered using a 0.22 micron polyether sulphone [PES] membrane filter and cooled down back to room temperature. About 5 ppm hydrogen peroxide is then added to the final IPC saline to prevent bioburden growth and the IPC saline is filtered using a 0.22 micron PES membrane filter. The prepared IPC saline is stored at 4° C. in a refrigerator until needed.

TABLE 5

Formulations and pre-treatment conditions for IPC salines.

| IPC Saline | [PAE]%[a] | [PAAm-PAA] %[a] | Pre-reaction Temperature/time |
|---|---|---|---|
| 61-1 | 0.088% | 0.07% | 60° C./6 hr |
| 61-2 | 0.044% | 0.07% | 65° C./6 hr |
| 61-3 | 0.044% | 0.14% | 65° C./6 hr |
| 65-3 | 0.132% | 0.368% | 65° C./7 hr |
| 64-7 | 0.088% | 0.245% | 65° C./6 hr |
| 64-9B[b] | | PBS only | |

[a]Concentration: % by weight;
[b]dip coating was done in 0.05% PAA aqueous solution (pH~2) at 35° C.

Lenses with PAA Base Coating.

After de-molding and de-lensing, dry silicone hydrogel contact lenses prepared in Example 4 are placed in extraction/coating trays. Then the trays with lenses are immersed into bathe #1 with 0.1% PAA aqueous solution (pH~2) for 30 min at 45° C., followed by placing the tray in the fresh PAA bath (Bath #2 with fresh 0.1% PAA aqueous solution (pH~2) for 90 min at 45° C. The PAA-coated lenses are rinsed in PBS and water, before packaged in one of IPC salines prepared above.

Lenses with Crosslinked Hydrophilic Coating.

Lenses having a PAA base coating thereon prepared above are placed in polypropylene lens packaging shells (one lens per shell) with 0.6 mL of PBS or one of the IPC salines (half of the saline is added prior to inserting the lens). The blisters are then sealed with foil and autoclaved for about 30 minutes at about 121° C., forming SiHy contact lenses with crosslinked coatings thereon in the presence of an IPC saline (no crosslinked hydrophilic coating is formed when the packaging saline is PBS). The coated Silicone hydrogel contact lenses are named after the name of the saline used in forming the top hydrogel coating.

Example 7

The surface mesh size of contact lenses is determined according to the procedures described in Example 2. The tested commercial contact lenses includes: ACUVUE® OASYS® 1-Day (Johnson & Johnson) which is a daily disposable silicone hydrogel contact lens without any coating thereon; ACUVUE® OASYS® (Johnson & Johnson) which is a silicone hydrogel contact lens without any coating thereon; Biotrue™ ONEday (Bausch & Lamb) which is a daily disposable non-silicone hydrogel contact lens; MyDay® (CooperVision) which is a daily disposable silicone hydrogel contact lens without any coating thereon; Biofinity® (CooperVision) which is a silicone hydrogel contact lens without any coating thereon; DAILIES® Aqua-Comfort Plus® ("DACP" from Alcon) which is a daily disposable non-silicone hydrogel contact lens; and DAILIES® TOTAL1® ("DT1" from Alcon) which is a daily disposable silicone hydrogel contact lens with a non-silicone hydrogel coating thereon. The silicone hydrogel contact lenses prepared in Example 5 (94-1, 94-2, 94-3 and 94-4) and in Example 6 (61-1, 61-2, 61-3, 64-7, 64-9B, 65-3) have two different silicone hydrogel bodies and 10 different coatings. The lenses 64-9B do not have a hydrogel coating thereon, but instead have an LbL coating thereon. The surface mesh size of the tested contact lenses is reported in Table 6.

TABLE 6

Surface mesh sizes for commercial non-silicone hydrogel contact lenses and DT1 lenses with non-silicone hydrogel coatings

| contact lens | Surface mesh size, $\xi$ (nm) | std dev. |
|---|---|---|
| Oasys (1 day) | 3.1 | 0.22 |
| Bio True | 2.5 | 0.39 |
| My Day | 2.6 | 0.22 |
| Biofinity | 2.7 | 0.28 |
| DACP | 4.1 | 0.37 |
| Oasys (2 wks) | 4.4 | 0.77 |
| DT1 | 10.8 | 0.11 |
| 61-1 | 9.4 | 0.12 |
| 61-2 | 6.4 | 0.12 |
| 61-3 | 3.0 | 0.28 |
| 94-1 | 6.8 | 0.23 |
| 94-2 | 16.4 | 0.25 |
| 94-3 | 7.8 | 0.40 |
| 94-4 | 5.2 | 0.20 |
| 64-7 | 4.7 | 0.29 |
| 64-9B | 3.2 | 0.40 |
| 65-3 | 4.8 | 0.62 |

Table 6 shows that commercially-available non-silicone hydrogel contact lenses i.e., lens bodies without any coating) have a surface mesh size of 4.1 nm or less; commercially-available silicone hydrogel contact lenses without any coating thereon (i.e., lens bodies) have a surface mesh size of 4.4 nm or less; DT1 lens with a non-silicone hydrogel coating thereon has a highest mesh size. It also shows that surface treatments, coating materials, and coating conditions can be selectively used in achieving a surface mesh size of at least 4.5 nm (i.e., a desired lubricity equal or superior to that reported for cartilage).

We claim:

1. A soft contact lens, comprising a lens body of a silicone hydrogel material and a coating of a non-silicone hydrogel thereon, wherein the silicone hydrogel material comprises first repeating units of at least one hydrophilic vinylic monomer and second repeating units selected from at least one silicone-containing vinylic monomer, a silicone-containing vinylic macromer, and/or any combination thereof, wherein the coating has a thickness of at least 20 nm, wherein the soft contact lens has a targeted lubricity as measured by a surface mesh size of 4.5 nm to 10.6 nm, wherein the surface mesh size, $\xi$, is determined from the following equation (5):

$$\Xi = C\xi \quad \text{(Equation 5)}$$

where C is a correlation factor between apparent mesh size $\Xi$ and mesh size determined by Small Angle X-ray Scattering (SAXS) for the hydrogel material, and $\Xi$ is the apparent mesh size within the surface region of the soft contact lens and determined in according to equation (4):

$$\Xi = [\pi a(\Delta r^2 - 2(RMS_{error})^2)]^{1/3} \quad \text{(Equation 4)}$$

where: $\Delta r^2$ is mean square displacement of a plurality of nanoparticles impregnated within the surface region of the soft contact lens and is determined from individual nanoparticles' trajectories obtained by tracking nanoparticles according to micro-rheological technique; $\alpha$ is particle radius; and $(RMS_{error})^2$ is root mean square error in $\Delta r$ and determined from an experimental noise amplitude measurement of the plurality nanoparticles.

2. The soft contact lens according to claim 1, wherein the coating has a thickness of 0.1 μm to 20 μm.

3. The soft contact lens according to claim 1, wherein the coating has a thickness of 0.25 μm to 15 μm.

4. The soft contact lens according to claim 1, wherein the soft contact lens has a targeted lubricity as measured by a surface mesh size of 5.0 nm to 10.6 nm.

5. The soft contact lens according to claim 1, wherein the soft contact lens has a targeted lubricity as measured by a surface mesh size of 6.0 nm to 10.6 nm.

6. The soft contact lens according to claim 1, wherein the soft contact lens has one or more of: an elastic modulus of from about 0.1 MPa to 1.8 MPa; a water content of from about 10% to 80% by weight when fully hydrated; a water-break-up time of at least about 10 seconds; a water contact angle of about 100 degrees or less; and/or any combination thereof.

7. The soft contact lens according to claim 1, wherein non-silicone hydrogel comprises one or more of:
repeating units of at least one vinylic monomer selected from the group consisting of (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth) acrylate having a weight average molecular weight of up to 1500, (meth)acrylic acid, vinyl alcohol, (meth) acryloyloxyethyl phosphorylcholine, and mixtures thereof;
repeating units of at least one vinylic crosslinking agent selected from the group consisting of di-(meth)acrylate-terminated polyethylene glycol, di-(meth)acrylate-terminated polyoxyethylene-polyoxypropylene block copolymer, tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and mixture thereof; and
polymer chain segments selected from the group consisting of polyoxyethylene segments, polyamidoamine segments, polyoxazoline segments, and mixtures thereof.

8. A soft contact lens according to claim 1, comprising a lens body of a silicone hydrogel material, wherein the silicone hydrogel material comprises first repeating units of at least one hydrophilic vinylic monomer and second repeating units selected from of at least one silicone-containing vinylic monomer, a silicone-containing vinylic macromer, and/or a combination thereof, wherein the lens body further comprises an internal wetting agent for improving the hydrophilicity and wettability of the lens body.

9. The soft contact lens according to claim 8, wherein the internal wetting agent comprises one or more of: at least one polymerizable internal wetting agent; at least one non-polymerizable internal wetting agent; and/or a combination thereof.

10. The soft contact lens according to claim 1, wherein the silicone hydrogel material comprises the second repeating units of the silicone-containing vinylic monomer which is a vinylic monomer having a tris(trialkylsilyloxy)silylalkyl group, a vinylic monomer having a bis(trialkylsilyloxy) alkylsilylalkyl group, or a vinylic monomer having a polysiloxane segment of

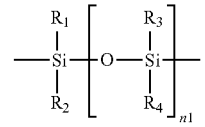

in which n1 is an integer of from 2 to 100, $R_1$, $R_2$, $R_3$, and $R_4$ independently of one another are a $C_1$-$C_{10}$ alkyl or $C_6$-$C_{18}$ aryl radical.

11. The soft contact lens according to claim 1, wherein the second repeating units of the silicone-containing vinylic macromer which is a polysiloxane vinylic macromer having a polysiloxane segment of

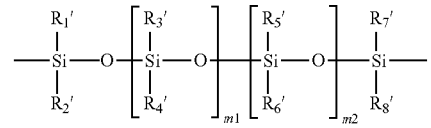

in which m1 and m2 independently of each other are an integer of from 0 to 500 and (m1+m2) is from 2 to 500, $R_1'$, $R_2'$, $R_3'$, $Ra'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, $C_5$-$C_{30}$ organic radical having one or more hydroxyl groups, -alk-$(OC_2H_4)_{m3}$—OR' (in which alk is $C_1$-$C_6$ alkyl diradical, R' is H or $C_1$-$C_4$ alkyl and m3 is an integer from 1 to 10), or a linear hydrophilic polymer chain.

12. A method for producing a soft contact lens, comprising the steps of: (a) obtaining a preformed contact lens body of a first hydrogel, wherein the first hydrogel is a silicone hydrogel material; (b) performing at least one surface treatment to form a first treated surface on the preformed contact lens body; and (c) applying at least one coating material onto the first treated surface of the preformed contact lens body, wherein the coating material is a second hydrogel, wherein the second hydrogel is a non-silicone hydrogel and has a targeted lubricity as measured by a targeted surface mesh size of at least 4.5 nm, wherein the surface mesh size, is determined from the following equation (5):

$$\Xi = C\xi \qquad \text{(Equation 5)}$$

Where C is a correlation factor between apparent mesh size $\Xi$ and mesh size determined by Small Angle X-ray Scattering (SAXS) for the hydrogel material, and $\Xi$ is the apparent mesh size within the surface region of the soft contact lens and determined in according to equation (4):

$$\Xi = [\pi a(\Delta r^2 - 2(RMS_{error})^2)^{1/3}] \qquad \text{(Equation 4)}$$

where: $\Delta r^2$ is mean square displacement of a plurality of nanoparticles impregnated within the surface region of the soft contact lens and is determined from individual nanoparticles' trajectories obtained by tracking nanoparticles according to micro-rheological technique; a is particle radius; and $(RMS_{error})^2$ is root mean square error in $\Delta r$ and determined from an experimental noise amplitude measurement of the plurality of nanoparticles.

13. The method according to claim 12, wherein the surface treatment comprises a plasma treatment, a graft-polymerization of one or more hydrophilic vinylic monomers and/or macromers, a layer-by-layer deposition of one or more first hydrophilic polymeric materials, covalently attachment of one or more second hydrophilic polymeric materials, or any combination thereof.

14. The method according to claim 12, wherein applying the coating comprises covalent attachment to a reactive base coating, wherein the reactive base coating is: an LbL coating, a plasma coating; combination of a plasma coating and an LbL coating thereon; a layer of one or more hydrophilic polymers obtained by covalently attachment or graft polymerization; or combination of plasma coating and a layer of one more hydrophilic polymers on top of the plasma coating.

15. The method according to claim 12, further comprising LbL coating said second hydrogel with an additional hydrophilic polymer.

16. The method according to claim 12, wherein applying the coating is heating a contact lens with a reactive base coating thereon in a solution comprising a water-soluble and thermally-crosslinkable hydrophilic polymeric material at a temperature of from 60° C. to 140° C.

* * * * *